US012686767B2

(12) United States Patent
Yuan et al.

(10) Patent No.: US 12,686,767 B2
(45) Date of Patent: Jul. 21, 2026

(54) RESIN COMPOSITION AND ARTICLE MADE THEREFROM

(71) Applicant: Elite Electronic Material (KunShan) Co., Ltd., Kunshan City (CN)

(72) Inventors: Mingsheng Yuan, Kunshan City (CN); Rongtao Wang, Kunshan City (CN); Yiqiang Ge, Kunshan City (CN)

(73) Assignee: ELITE ELECTRONIC MATERIAL (KUNSHAN) CO., LTD., Kunshan City (CN)

(*) Notice: Subject to any disclaimer, the term of this patent is extended or adjusted under 35 U.S.C. 154(b) by 491 days.

(21) Appl. No.: 18/500,453

(22) Filed: Nov. 2, 2023

(65) Prior Publication Data

US 2025/0075069 A1 Mar. 6, 2025

(30) Foreign Application Priority Data

Sep. 1, 2023 (CN) ......................... 202311123126.3

(51) Int. Cl.

| | |
|---|---|
| ***C08L 65/00*** | (2006.01) |
| ***C08F 222/40*** | (2006.01) |
| ***C08G 73/12*** | (2006.01) |
| ***C08K 5/00*** | (2006.01) |
| ***C08K 5/01*** | (2006.01) |
| ***C08K 5/101*** | (2006.01) |
| ***C08K 5/5399*** | (2006.01) |
| ***C08L 35/00*** | (2006.01) |
| ***C08L 79/08*** | (2006.01) |

(52) U.S. Cl.

CPC ............ *C08L 65/00* (2013.01); *C08F 222/40* (2013.01); *C08G 73/12* (2013.01); *C08K 5/0025* (2013.01); *C08K 5/01* (2013.01); *C08K 5/101* (2013.01); *C08K 5/5399* (2013.01); *C08L 35/00* (2013.01); *C08L 79/085* (2013.01)

(58) Field of Classification Search

CPC ........ C08L 33/24; C08L 35/00; C08L 79/085; C08F 20/52; C08F 220/52; C08F 30/02; C08F 230/02; C08F 22/40; C08F 222/40–408; C08K 5/5399; C08G 73/12

See application file for complete search history.

(56) References Cited

FOREIGN PATENT DOCUMENTS

| | | | | | |
|---|---|---|---|---|---|
| CN | 103980706 A | * | 8/2014 | .............. | C08L 63/00 |
| JP | 2013075836 A | * | 4/2013 | | |
| JP | 2013075940 A | * | 4/2013 | | |
| JP | 2013075942 A | * | 4/2013 | | |

OTHER PUBLICATIONS

CN-103980706-A translation (Year: 2014).*
Translation of JP-2013075836-A (Year: 2013).*
Translation of JP-2013075940-A (Year: 2013).*
Translation of JP-2013075942-A (Year: 2013).*

* cited by examiner

*Primary Examiner* — Kregg T Brooks

(74) *Attorney, Agent, or Firm* — MUNCY, GEISSLER, OLDS & LOWE, P.C.

(57) ABSTRACT

A resin composition and an article made therefrom are provided. The resin composition includes: (A) 100 parts by weight of a maleimide resin; (B) 30 to 120 parts by weight of a compound of Formula (1); and (C) 3 to 20 parts by weight of a compound of Formula (2). The resin composition may be used to make a prepreg, a resin film, a laminate or a printed circuit board, and at least one of the following properties can be improved, including thermal decomposition temperature, percent of thermal expansion in Z-axis, reflow shrinkage-stretch rate, flexural modulus and storage modulus decay rate.

Formula (1)

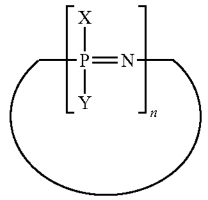

Formula (2)

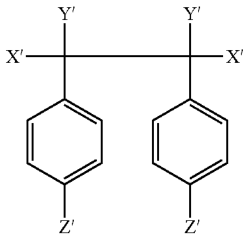

16 Claims, No Drawings

RESIN COMPOSITION AND ARTICLE MADE THEREFROM

CROSS-REFERENCE TO RELATED APPLICATION

This application claims the priority benefits of China Patent Application No. 202311123126.3, filed on Sep. 1, 2023. The entirety of the above-mentioned patent application is hereby incorporated by reference herein and made a part of this specification.

BACKGROUND

1. Field of the Disclosure

The present disclosure mainly relates to a resin composition and an article made therefrom, more particularly to a resin composition useful for preparing a prepreg, a resin film, a laminate (e.g., a copper-clad laminate) and a printed circuit board, and an article made therefrom.

2. Description of Related Art

Printed circuit board (PCB), as a basic electronic component, is used in many fields such as mobile phones, computers, communication base stations, data centers, automobiles, industrial control, aerospace, etc., the technical level thereof and reliability having direct impacts on performance and stability of electronic equipment. With the development of technologies such as 5G and computing networks, the transmission rate and communication frequency of signals have been greatly improved. Copper-clad laminate (CCL), as a laminate material of PCB, mainly plays the role of the interconnection and conduction, insulation and support for PCB, and has great influences on the transmission rate, energy loss and characteristic impedance of signals in circuits. Therefore, the properties of PCB, such as performance, quality, processability, reliability, stability, etc., depend on the performance and quality of copper-clad laminates to a large extent.

The current problems of process capability, signal integrity, heat dissipation and stress are faced by advanced PCB packaging technology, presenting more challenges to the performance of copper-clad laminates, including one or more properties of higher thermal decomposition temperature, lower percent of thermal expansion in Z-axis, lower reflow shrinkage-stretch rate, higher flexural modulus and lower storage modulus decay rate.

However, the existing copper-clad laminates and the resin compositions used in the preparation thereof still mainly focus on the general characteristics of copper-clad laminates.

Accordingly, there is an urgent need to develop a resin composition and an article made therefrom that meet one or more of the above-mentioned property demands.

SUMMARY

To overcome the problems facing prior arts, particularly one or more of the above-mentioned technical problems of conventional materials, it is a primary object of the present disclosure to provide a resin composition and an article made therefrom which may overcome at least one of the above-mentioned technical problems.

To achieve the above-mentioned objects, the present disclosure provides a resin composition, comprising:

(A) 100 parts by weight of a maleimide resin;

(B) 30 to 120 parts by weight of a compound of Formula (1); and (C) 3 to 20 parts by weight of a compound of Formula (2),

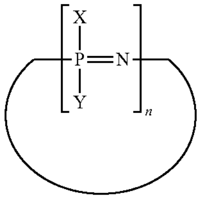

Formula (1)

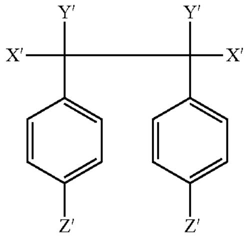

Formula (2)

in Formula (1), n is an integer of 3 to 6, and X and Y each independently represent o-vinylphenoxy group, m-vinylphenoxy group or p-vinylphenoxy group;

in Formula (2), each X', Y' and Z' independently represent an alkyl group with 1 to 4 carbon atoms, a phenyl group, a hydrogen atom or an unsaturated C═C double bond-containing group.

For example, in one embodiment, the maleimide resin comprises 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-dimethylphenyl maleimide, N-2,6-dimethylphenyl maleimide, N-phenylmaleimide, vinyl benzyl maleimide, maleimide containing m-arylene structure, maleimide containing biphenylalkylene structure, maleimide containing indane structure, maleimide containing aliphatic structure with 10 to 50 carbon atoms, or a combination thereof.

For example, in one embodiment, the maleimide containing m-arylene structure comprises the maleimide of Formula (3), the maleimide containing biphenylalkylene structure comprises the maleimide of Formula (4), and the maleimide containing indane structure comprises the maleimide of Formula (5),

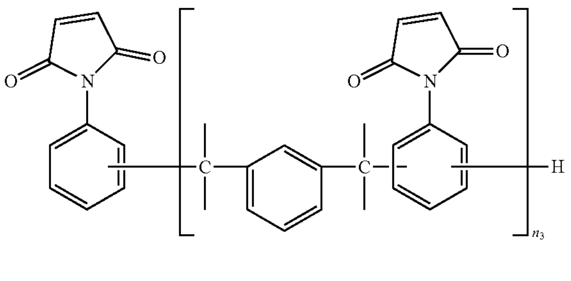

Formula (3), wherein $n_3$ is a number of 1 to 10;

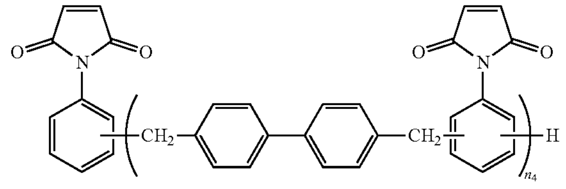

Formula (4), wherein $n_4$ is a number of 1 to 10;

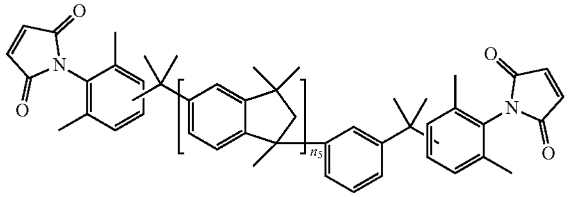

Formula (5), wherein $n_5$ is a number of 0.5 to 20.

For example, in one embodiment, the compound of Formula (2) has at least one unsaturated C═C double bond-containing group.

For example, in one embodiment, in Formula (2), at least one of X', Y' and Z' represents a vinyl group, a styryl group, an allyl group or a (meth)acryloyloxy group.

For example, in one embodiment, the compound of Formula (1) comprises any one of a compound of Formula (1-1) to a compound of Formula (1-14) or a combination thereof.

Formula (1-1)

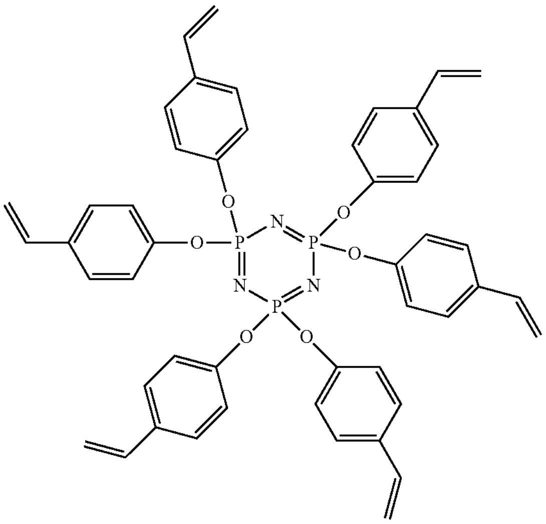

-continued

Formula (1-2)

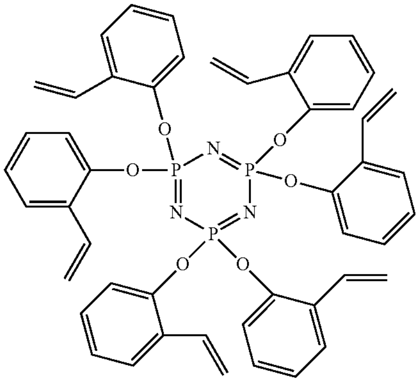

Formula (1-3)

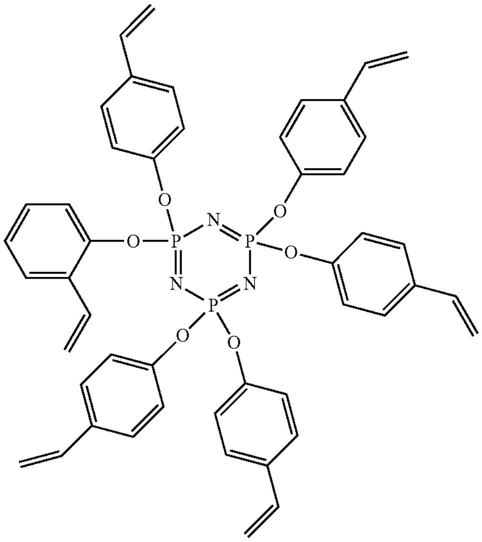

Formula (1-4)

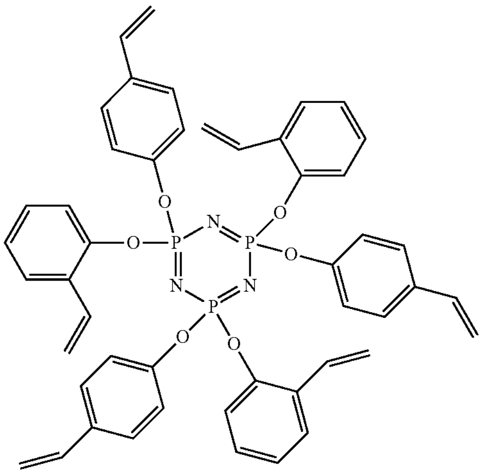

-continued
Formula (1-5)
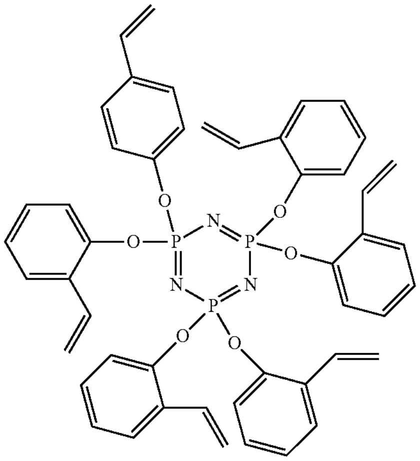
Formula (1-6)
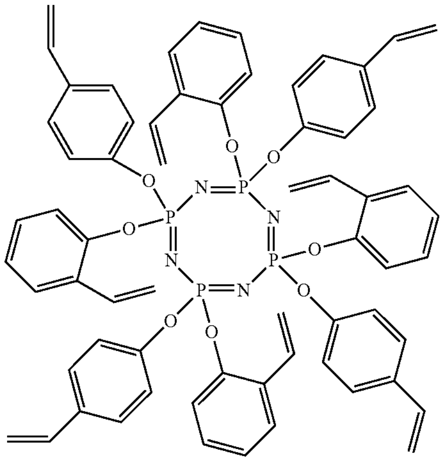
Formula (1-7)
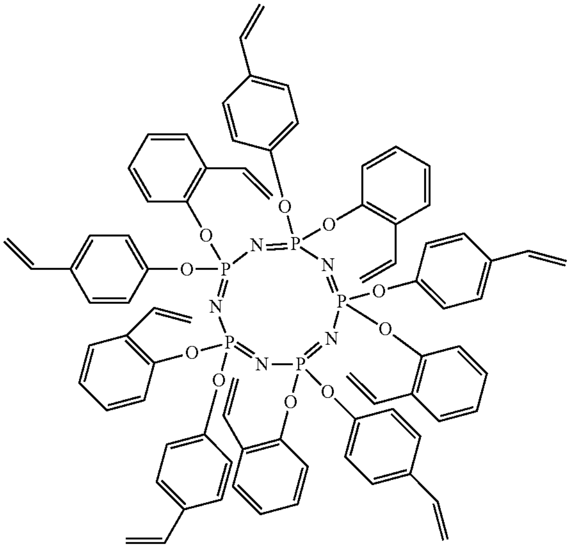
-continued
Formula (1-8)
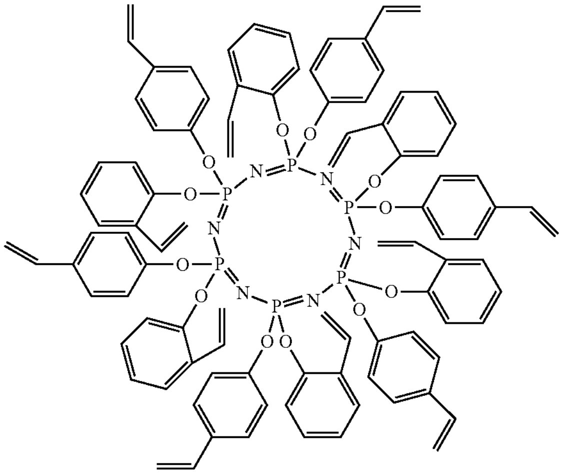
Formula (1-9)
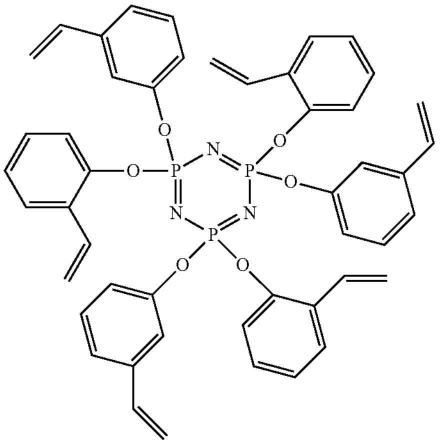
Formula (1-10)
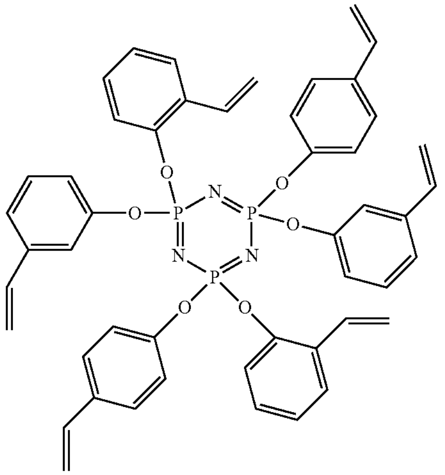

-continued
Formula (1-11)
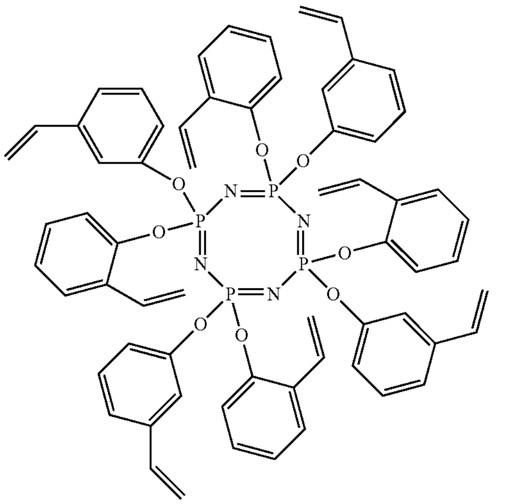
Formula (1-12)
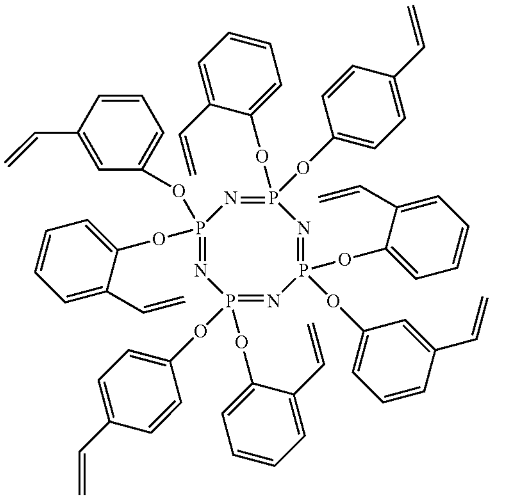
Formula (1-13)
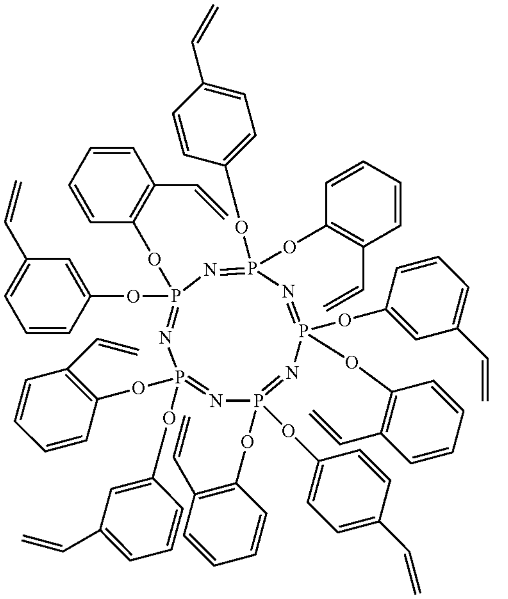
-continued
Formula (1-14)
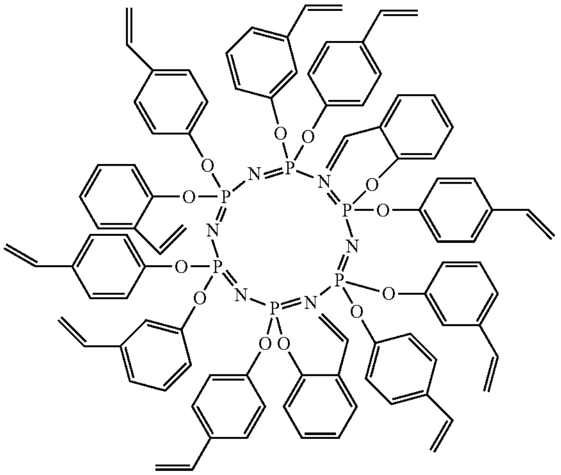
For example, in one embodiment, the compound of Formula (2) comprises any one of a compound of Formula (2-1) to a compound of Formula (2-6) or a combination thereof:
Formula (2-1)
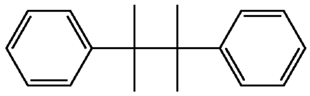
Formula (2-2)
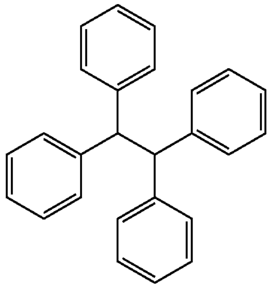
Formula (2-3)
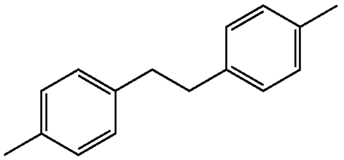
Formula (2-4)
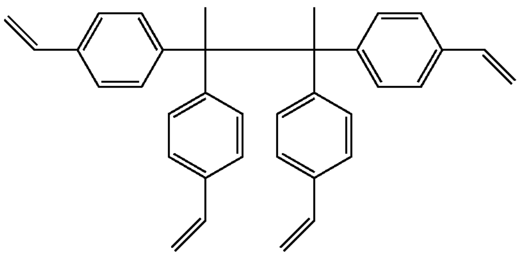

-continued

Formula (2-5)

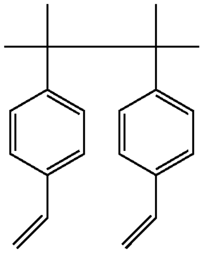

Formula (2-6)

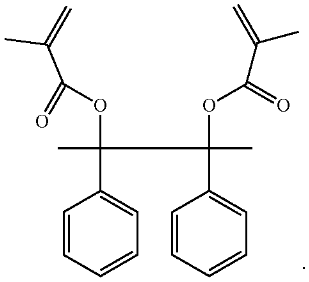

For example, in one embodiment, the resin composition further comprises 2 to 30 parts by weight of an unsaturated C═C double bond-containing crosslinking agent, the unsaturated C═C double bond-containing crosslinking agent being any one of bis(vinylphenyl)ethane, divinylbenzene, divinylnaphthalene, divinylbiphenyl, triallyl isocyanurate, triallyl cyanurate, vinylbenzocyclobutene, bis(vinylbenzyl)ether, trivinyl cyclohexane, diallyl bisphenol A, acrylate with two or more functional groups, butadiene, decadiene and octadiene or a combination thereof.

For example, in one embodiment, the resin composition further comprises any one of a polyolefin, a benzoxazine resin, an epoxy resin, a polyester resin, a phenolic resin, an amine curing agent, a polyamide, a polyimide, a styrene maleic anhydride and a cyanate ester or a combination thereof.

For example, in one embodiment, the resin composition further comprises any one of an inorganic filler, a flame retardant different from the compound of Formula (1), a curing accelerator different from the compound of Formula (2), a polymerization inhibitor, a solvent, a silane coupling agent, a coloring agent and a toughening agent or a combination thereof.

On the other hand, to achieve the above-mentioned objects, the present disclosure further provides an article made from the aforesaid resin composition, including a prepreg, a resin film, a laminate or a printed circuit board.

For example, in one embodiment, the article described above has at least one, more or all of the following properties:

- a thermal decomposition temperature as measured by reference to IPC-TM-650 2.4.24.6 of greater than or equal to 430° C.;
- a percent of thermal expansion in Z-axis as measured by reference to IPC-TM-650 2.4.24.5 of less than or equal to 0.80%;
- a reflow shrinkage-stretch rate as measured by reference to IPC-TM-650 2.4.39 of less than or equal to 180 ppm;
- a flexural modulus as measured by reference to IPC-TM-650 2.4.4 of greater than or equal to 23.0 GPa; and
- a storage modulus decay rate as measured and calculated by reference to IPC-TM-650 2.4.24.4 of less than or equal to 26.3%.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition comprising a list of elements or an article made therefrom encompasses any one or any type of the listed elements and is not necessarily limited to only those elements listed herein, but may also include other elements not expressly listed or inherent to such composition or article. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

As used herein, "or a combination thereof" means "or any combination thereof" encompasses any combination of two or more of the listed elements, and "any" means "any one", vice versa. For example, "a composition or an article made therefrom includes A, B, C or a combination thereof" is construed to encompass the following situations: A is true (or present), and B and C are false (or not present); B is true (or present), and A and C are false (or not present); C is true (or present), and A and B are false (or not present); A and B are true (or present), and C is false (or not present); A and C are true (or present), and B is false (or not present); B and C are true (or present), and A is false (or not present); and A and B and C are all true (or present), and it is also contemplated that the composition or an article thereof contains or does not contain elements other than A, B and C not expressly listed but inherent to such composition or article.

As used herein, the term "and" or any other variant thereof is used to connect parallel sentence components, and there is no distinction between the front and rear components. The meaning of the parallel sentence components does not change in the grammatical sense after the position is exchanged.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. A copolymer refers to the polymer formed by the polymerization of two or more types of monomers. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer or a styrene-butadiene block copolymer. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

To those of ordinary skill in the art to which this disclosure pertains, a resin composition containing an additive and three compounds (e.g., A, B and C), a total of four components, is different from a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing a crosslinking agent and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between A, B and C individually and the crosslinking agent. As such, articles made from the two resin compositions will be completely different and have completely different properties.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C═C double bond with the potential of being crosslinked with other functional groups, but not limited thereto. The unsaturated C═C double bond as used herein preferably comprises, but not limited to, a vinyl group, a styryl group, a vinylbenzyl group, a (meth)acryloyl group, an allyl group or a combination thereof. The term "vinyl group" is construed as comprising a vinyl group and a vinylene group, and the term "(meth)acryloyl group" is construed as comprising an acryloyl group and a methacryloyl group.

Unless otherwise specified, the alkyl group, the alkenyl group and the monomer described herein are construed to encompass various isomers thereof. For example, a propyl group is construed to encompass n-propyl and iso-propyl.

Unless otherwise specified, as used herein, part(s) by weight represents weight part(s) in any weight unit in the resin composition, such as but not limited to kilogram, gram, pound and so on. For example, 100 parts by weight of a maleimide resin may represent 100 kilograms of the maleimide resin or 100 pounds of the maleimide resin.

Unless otherwise specified, in the present disclosure, wt % represents weight (or mass) percentage.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

As described above, the present disclosure provides a resin composition, comprising the following components:

(A) 100 parts by weight of a maleimide resin;

(B) 30 to 120 parts by weight of a compound of Formula (1), such as 30, 40, 50, 55, 60, 70, 80, 90, 100, 110.5 or 120 parts by weight, but not limited thereto; and (C) 3 to 20 parts by weight of a compound of Formula (2), such as 3, 5, 8, 10, 15 or 20 parts by weight, but not limited thereto;

Formula (1)

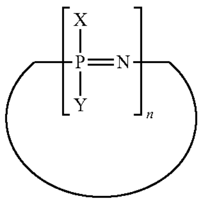

-continued

Formula (2)

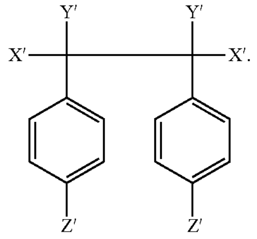

in Formula (1), n is an integer of 3 to 6 (e.g., 3, 4, 5 or 6), and X and Y each independently represent o-vinylphenoxy group, m-vinylphenoxy group or p-vinylphenoxy group. The structures of o-vinylphenoxy group, m-vinylphenoxy group and p-vinylphenoxy group are respectively shown as below, wherein * represents the position bonded to a phosphorus atom.

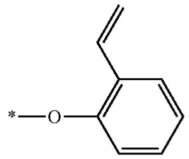 [SMILES: *Oc1ccccc1C=C]

o-vinylphenoxy group:

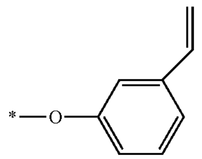 [SMILES: *Oc1cccc(C=C)c1]

m-vinylphenoxy group:

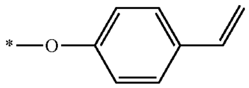 [SMILES: *Oc1ccc(C=C)cc1]

p-vinylphenoxy group:

In Formula (2), each X', Y' and Z' independently represent an alkyl group with 1 to 4 carbon atoms, a phenyl group, a hydrogen atom or an unsaturated C═C double bond-containing group. For example, in one embodiment, two X' may be the same or different from each other and independently represent an alkyl group with 1 to 4 carbon atoms, a phenyl group, a hydrogen atom or an unsaturated C═C double bond-containing group. For example, in one embodiment, the compound of Formula (2) has at least one unsaturated C═C double bond-containing group (such as but not limited to any one of a vinyl group, a styryl group, an allyl group and a (meth)acryloyloxy group or a combination thereof). For example, in one embodiment, in Formula (2), at least one of X', Y' and Z' represents a vinyl group, a styryl group, an allyl group or a (meth)acryloyloxy group.

For example, in one embodiment, the compound of Formula (1) comprises any one of a compound of Formula (1-1) to a compound of Formula (1-14) or a combination thereof. For example, in one embodiment, the compound of Formula (2) comprises any one of a compound of Formula (2-1) to a compound of Formula (2-6) or a combination thereof.

The maleimide resin suitable for the present disclosure is not particularly limited and may include any one or more maleimide resins useful in the field to which this disclosure pertains. Examples include but are not limited to: 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenyl methane bismaleimide, m-phenylene bismaleimide, 4-methyl-1,3-phenylene bismaleimide, 1,6-bismaleimide-(2,2,4-trimethyl)hexane, N-2,3-dimethylphenyl maleimide, N-2,6-dimethylphenyl maleimide, N-phenylmaleimide, vinyl benzyl maleimide (VBM), maleimide resin containing aliphatic structure with 10 to 50 carbon atoms, maleimide containing m-arylene structure, maleimide containing biphenylalkylene structure, maleimide containing indane structure, or a combination thereof. These components should be construed as including their modifications, including but not limited to diallyl compound-modified maleimide resin, diamine-modified maleimide resin, multi-functional amine-modified maleimide resin, acid phenol compound-modified maleimide resin, cyanate-modified maleimide resin or a combination thereof.

For example, the maleimide containing m-arylene structure comprises the maleimide of Formula (3), the maleimide containing biphenylalkylene structure comprises the maleimide of Formula (4), and the maleimide containing indane structure comprises the maleimide of Formula (5).

For example, the maleimide resin includes but is not limited to products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000, and BMI-7000H available from Daiwakasei Industry, products such as BMI-70 and BMI-80 available from K.I Chemical Industry Co., Ltd., or products such as MIR-3000 and MIR-5000 available from Nippon Kayaku.

For example, the maleimide resin containing aliphatic structure with 10 to 50 carbon atoms, also known as imide-extended maleimide resin, may include various imide-extended maleimide resins disclosed in the TW Patent Application Publication No. 200508284A, all of which are incorporated herein by reference in their entirety. The maleimide resin containing aliphatic long chain structure with 10 to 50 carbon atoms suitable for the present disclosure may include, but not limited to, products such as BMI-689, BMI-1400, BMI-1500, BMI-1700, BMI-2500, BMI-3000, BMI-5000 and BMI-6000 available from Designer Molecules Inc.

For example, unless otherwise specified, the cyanate-modified maleimide resin (a.k.a. maleimide triazine resin) used in the present disclosure is not particularly limited and may include any one or more maleimide triazine resins useful for preparing a prepreg, a resin film, a laminate or a printed circuit board. For example, the maleimide triazine resin may be obtained by polymerizing the cyanate ester resin and the aforesaid maleimide resin. For example, the maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

According to the present disclosure, the compound of Formula (1) is a cyclophosphazene compound containing P═N bonds, wherein n represents the number of P═N bonds, and n is an integer of 3 to 6. In other words, when n is 3, the compound of Formula (1) is a cyclophosphazene with a six-membered ring; when n is 6, the compound of Formula (1) is a cyclophosphazene with a twelve-membered ring. In addition, the phosphorus atoms in the cyclophosphazene structure of the compound of Formula (1) may be substituted by o-vinylphenoxy group, m-vinylphenoxy group or p-vinylphenoxy group.

According to the present disclosure, for example, when n is 3, the sum of the number of o-vinylphenoxy groups, m-vinylphenoxy groups and p-vinylphenoxy groups in the cyclophosphazene structure of the compound of Formula (1) is 6, wherein the number of o-vinylphenoxy groups may be 0, 1, 2, 3, 4, 5 or 6, the number of m-vinylphenoxy groups may be 0, 1, 2, 3, 4, 5 or 6, and the number of p-vinylphenoxy groups may be 0, 1, 2, 3, 4, 5 or 6. For example, when n is 3, in the cyclophosphazene structure of the compound of Formula (1), the number of o-vinylphenoxy groups is 0, the number of p-vinylphenoxy groups is 6, and the number of m-vinylphenoxy groups is 0. For example, when n is 3, in the cyclophosphazene structure of the compound of Formula (1), the number of o-vinylphenoxy groups is 6, the number of p-vinylphenoxy groups is 0, and the number of m-vinylphenoxy groups is 0. For example, when n is 3, in the cyclophosphazene structure of the compound of Formula (1), the number of o-vinylphenoxy groups is 3, the number of p-vinylphenoxy groups is 2, and the number of m-vinylphenoxy groups is 1. For example, when n is 6, the sum of the number of o-vinylphenoxy groups, m-vinylphenoxy groups and p-vinylphenoxy groups in the cyclophosphazene structure of the compound of Formula (1) is 12, wherein the number of o-vinylphenoxy groups may be 0, 1, 2, 3, 4, 5, 6, 7, 8, 9, 10, 11 or 12, the number of m-vinylphenoxy groups may be 0, 1, 2, 3, 4, 5, 6, 7, 8, 9, 10, 11 or 12, and the number of p-vinylphenoxy groups may be 0, 1, 2, 3, 4, 5, 6, 7, 8, 9, 10, 11 or 12.

According to the present disclosure, unless otherwise specified, the pH value of the compound of Formula (1) is not particularly limited, preferably being 5 to 10, such as but not limited to 5, 6, 7, 8, 9 or 10. A pH value of less than 5 or greater than 10 will have a negative impact on the dielectric aging performance of an article. The pH value of a compound may be measured by using a conventional instrument known in the art, such as but not limited to measured by using a pH meter or titrated by using acid-base titration. For example, in one embodiment, the compound of Formula (1) and deionized water having a pH value of 7 are mixed at a weight ratio of 1:10, and the mixture is filtered and extracted at room temperature. The pH value of the extract is measured by using a pH meter so as to obtain the pH value of the compound of Formula (1). When measured by a pH meter, the pH value of the compound of Formula (1) may also be a fractional value, such as 5.5, 6.5 or 7.3, but not limited thereto.

According to the present disclosure, unless otherwise specified, the compound of Formula (1) may be prepared by various methods known by those having ordinary skilled in the art.

For example, the compound of Formula (1) may be prepared by the following processes:

Step (1): Chlorocyclophosphazene is reacted with hydroxybenzaldehyde (o-hydroxy benzaldehyde and/or m-hydroxybenzaldehyde and/or p-hydroxybenzaldehyde) to obtain an intermediate; and Step (2): The intermediate is reacted with methyltriphenylphosphine bromide in the presence of a catalytic base to obtain the compound of Formula (1).

In step (1), an acid binding agent may be further optionally added, and the acid binding agent includes but is not limited to potassium carbonate, triethylamine or a combination thereof.

In step (1), an organic solvent may be further optionally added, and the organic solvent includes but is not limited to tetrahydrofuran. Unless otherwise specified, the tetrahydrofuran used in the present disclosure is dehydrated tetrahydrofuran (anhydrous tetrahydrofuran).

In step (1), the chlorocyclophosphazene includes but is not limited to hexachlorocyclotriphosphazene, octachlorocyclotetraphosphazene, decachlorocyclo pentaphosphazene, dodecachlorocyclohexaphosphazene or a combination thereof. For example, the molar ratio of the chlorocyclophosphazene to hydroxybenzaldehyde is 1:6 to 1:12.

In step (1), for example, the reaction temperature after adding o-hydroxybenzaldehyde, m-hydroxybenzaldehyde or p-hydroxybenzaldehyde is 40 to 70° C., and the reaction time is 24 to 96 hours, preferably 48 to 72 hours.

In step (2), the catalytic base includes but is not limited to potassium tert-butoxide, sodium methoxide or a combination thereof, for example, the reaction temperature after adding the catalytic base is 25 to 50° C., and the reaction time is 1 to 6 hours, preferably 2 to 3 hours.

In step (2), an organic solvent may be further optionally added, and the organic solvent includes but is not limited to dehydrated tetrahydrofuran.

In step (2), calcium bromide may also be optionally added. The reaction temperature after adding calcium bromide is 25 to 50° C., and the reaction time is 12 to 72 hours, preferably 24 to 48 hours.

In step (2), for example, the pH value of the reaction system can be adjusted to 3 to 13 by acetic acid aqueous solution or ammonium chloride aqueous solution.

The compound of Formula (2) described herein may be commercially available or prepared by various methods known by those having ordinary skilled in the art. For example, a free radical initiator can be used to promote isopropylbenzene (also known as cumene) to generate the corresponding isopropylbenzene free radicals, which are coupled in pairs to obtain the compound of Formula (2-1). By subjecting tetraphenylethylene to a hydrogenation reaction in the presence of palladium acetate, ethyl acetate and pinacolborane, the compound of Formula (2-2) can be obtained. By subjecting benzyl chloride to a Wutz coupling reaction, a Grignard coupling reaction or a coupling reaction with active metals, the compound of Formula (2-3) can be obtained. By subjecting 1,1'-bis(4-bromophenyl)ethane to a vinylation reaction with vinylmagnesium bromide, followed by bromination with N-bromosuccinimide and using zinc powder for a coupling reaction, the compound of Formula (2-4) with a styryl group can be obtained. By brominating 4-isopropylbenzaldehyde with N-bromosuccinimide, followed by using zinc powder for a coupling reaction to obtain 2,3-dimethyl-2,3bis(4-formylphenyl)butane, which was subjected to a Wittig reaction by using methyltriphenylphosphine bromide, the compound of Formula (2-5) with a vinyl group can be obtained. By subjecting acetophenone and titanium tetrachloride to a coupling reaction, followed by epoxidizing with benzoic acid peroxide and reacting with 10% sulfuric acid solution to generate 1,2-dimethyldiphenylbutanediol, which was reacted by adding methacryloyl chloride, the compound of Formula (2-6) with a (meth) acryloyloxy group can be obtained.

For example, in one embodiment, the resin composition disclosed herein may further comprise an unsaturated C═C double bond-containing crosslinking agent. For example, relative to 100 parts by weight of the maleimide resin, the resin composition of the present disclosure may comprise 2 parts by weight to 30 parts by weight of an unsaturated C═C double bond-containing crosslinking agent, preferably 2 parts by weight to 10 parts by weight of an unsaturated C═C double bond-containing crosslinking agent.

The unsaturated C═C double bond-containing crosslinking agent suitable for the present disclosure refers to an unsaturated C═C double bond-containing small molecule compound containing two or more functional groups with a molecular weight of less than or equal to 1000, and the molecular weight thereof is preferably between 100 and 900, more preferably between 100 and 800. For example, the unsaturated C═C double bond-containing crosslinking agent is any one of bis(vinylphenyl)ethane (BVPE), divinylbenzene (DVB), divinylnaphthalene, divinylbiphenyl, triallyl isocyanurate (TAIC), triallyl cyanurate (TAC), vinylbenzocyclobutene (VBCB), bis(vinylbenzyl)ether (BVBE), trivinyl cyclohexane (TVCH), diallyl bisphenol A (DABPA), acrylate with two or more functional groups, butadiene, decadiene, octadiene, or a combination thereof.

The acrylate with two or more functional groups includes various bifunctional acrylates, trifunctional acrylates or tetrafunctional or higher acrylates commonly known in the art, and can be purchased from Shin Nakamura Chemical Industry Co., Ltd., Kyoeisha Chemical Co., Ltd., Nippon Kayaku Co., Ltd. or Sartomer. Examples include but are not limited to any one of diallyl isophthalate (DAIP), dioxanediol diacrylate, tricyclodecane dimethanol diacrylate, tricyclodecane dimethanol dimethacrylate or a combination thereof.

For example, in one embodiment, the resin composition disclosed herein further comprises any one of a polyolefin, a benzoxazine resin, an epoxy resin, a polyester resin, a phenolic resin, an amine curing agent, a polyamide, a polyimide, a styrene maleic anhydride, a cyanate ester or a combination thereof.

Unless otherwise specified, in the resin composition of the present disclosure, relative to 100 parts by weight of the maleimide resin, the amount of a polyolefin, a benzoxazine resin, an epoxy resin, a polyester resin, a phenolic resin, a polyamide, a polyimide, a styrene maleic anhydride or a cyanate ester is not particularly limited and may for example range from 1 part by weight to 100 parts by weight, such as but not limited to 1 part by weight, 10 parts by weight, 15 parts by weight, 20 parts by weight, 25 parts by weight, 50 parts by weight or 100 parts by weight. Relative to 100 parts by weight of the maleimide resin, the amount of the amine curing agent is also not particularly limited and may for example range from 1 part by weight to 15 parts by weight, such as but not limited to 1 part by weight, 4 parts by weight, 7.5 parts by weight, 12 parts by weight or 15 parts by weight.

For example, in one embodiment, the resin composition of the present disclosure may further comprise a polyolefin. The polyolefin suitable for the present disclosure is not particularly limited and may be any one or more polyolefins useful for making a prepreg, a resin film, a laminate, or a printed circuit, such as any one or more commercial products, products prepared by the Applicant or a combination thereof. For example, the polyolefin suitable for the present disclosure includes but is not limited to a diene polymer, a monoene polymer, a hydrogenated diene polymer or a combination thereof. The diene refers to a hydrocarbon compound containing two unsaturated C═C double bonds in the molecule, and the monoene refers to a hydrocarbon compound containing one unsaturated C═C double bond in the molecule. The polyolefin suitable for the present disclosure comprises, such as but not limited to, any one of polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane polymer, maleic anhydride-butadiene copolymer, polymethylstyrene, hydrogenated polybutadiene, hydrogenated polyisoprene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer and polyfunctional vinyl aromatic copolymer, or a combination thereof. For example, unless otherwise specified, the polyfunctional vinyl aromatic copolymer may include various polyfunctional vinyl aromatic copolymers disclosed in the US Patent Application Publication No. 20070129502A1, all of which are incorporated herein by reference in their entirety.

According to the present disclosure, for example, the benzoxazine resin may be any benzoxazine resins known in the field to which this disclosure pertains. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin and phenyl group-modified, vinyl group-modified or allyl group-modified benzoxazine resin. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl-modified benzoxazine resin) and KZH-5032 (phenyl-modified benzoxazine resin) available from Kolon Industries Inc. The diamino benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

According to the present disclosure, for example, the epoxy resin may be any epoxy resins known in the field to which this disclosure pertains. In terms of improving the heat resistance of the resin composition, the epoxy resin may include, but not limited to, any one of bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof.

According to the present disclosure, for example, the novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. According to the present disclosure, for example, the phosphorus-containing epoxy resin may be DOPO (9,10-dihydro-9-oxa-10-phosphaphenanthrene-10-oxide) epoxy resin, DOPO-HQ epoxy resin or a combination thereof.

The DOPO epoxy resin may be any one or more selected from DOPO-containing phenol novolac epoxy resin, DOPO-containing o-cresol novolac epoxy resin and DOPO-containing bisphenol-A novolac epoxy resin; the DOPO-HQ epoxy resin may be any one or more selected from DOPO-HQ-containing phenol novolac epoxy resin, DOPO-HQ-containing o-cresol novolac epoxy resin and DOPO-HQ-containing bisphenol-A novolac epoxy resin, but not limited thereto.

According to the present disclosure, for example, the polyester resin may be any polyester resins known in the field to which this disclosure pertains. Examples include but are not limited to a dicyclopentadiene-containing polyester resin and a naphthalene-containing polyester resin. Examples include, but not limited to, HPC-8000 or HPC-8150 available from D.I.C. Corporation.

According to the present disclosure, for example, the phenolic resin may be any phenolic resins known in the field to which this disclosure pertains. Examples include but are not limited to phenoxy resin or novolac resin (such as phenol novolac resin, o-cresol novolac resin, bisphenol A novolac resin, naphthol novolac resin, biphenyl novolac resin, and dicyclopentadiene phenol resin), but not limited thereto.

According to the present disclosure, for example, the amine curing agent may be any amine curing agents known in the field to which this disclosure pertains. Examples include but are not limited to any one or a combination of diamino diphenyl sulfone, diamino diphenyl methane, diamino diphenyl ether, diamino diphenyl sulfide and dicyandiamide.

According to the present disclosure, for example, the polyamide may be any polyamides known in the field to which this disclosure pertains. Examples include but are not limited to various commercially available polyamide resin products.

According to the present disclosure, for example, the polyimide may be any polyimides known in the field to which this disclosure pertains. Examples include but are not limited to various commercially available polyimide resin products.

According to the present disclosure, for example, the styrene maleic anhydride may be any styrene maleic anhydrides known in the field to which this disclosure pertains, wherein the molar ratio of styrene (St) to maleic anhydride (MA) may be 1/1, 2/1, 3/1, 4/1, 6/1, 8/1 or 12/1. Examples include but are not limited to styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope.

According to the present disclosure, for example, the cyanate ester may be any cyanate ester resins known in the field to which this disclosure pertains, such as a compound having an Ar—O—C—N structure, wherein Ar may be a substituted or unsubstituted aromatic group. In terms of improving the heat resistance of the resin composition, examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL950S, HTL-300, CE-320, LVT-50, or LeCy sold by Lonza.

For example, in one embodiment, the resin composition further comprises any one of an inorganic filler, a flame retardant different from the compound of Formula (1), a curing accelerator different from the compound of Formula (2), a polymerization inhibitor, a solvent, a silane coupling agent, a coloring agent and a toughening agent or a combination thereof.

According to the present disclosure, for example, the inorganic filler may be any one or more inorganic fillers suitable for preparing a prepreg, a resin film, a laminate or a printed circuit board, examples thereof including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, zirconium tungstate, petalite, calcined kaolin or a combination thereof. Moreover, the inorganic filler can be spherical (including solid sphere or hollow sphere), fibrous, plate-like, particulate, flake-like or whisker-like and can be optionally pretreated by a silane coupling agent. For example, in one embodiment, relative to 100 parts by weight of the maleimide resin, the resin composition of the present disclosure may further comprise 10 parts by weight to 300 parts by weight of an inorganic filler, preferably 50 parts by weight to 300 parts by weight of an inorganic filler, more preferably 80 parts by weight to 250 parts by weight of an inorganic filler, but not limited thereto.

According to the present disclosure, for example, the flame retardant different from the compound of Formula (1) may be any one or more flame retardants suitable for preparing a prepreg, a resin film, a laminate or a printed circuit board, such as but not limited to a phosphorus-containing flame retardant or a bromine-containing flame retardant. The bromine-containing flame retardant preferably comprises decabromodiphenyl ethane, and the phosphorus-containing flame retardant preferably comprises: hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201 and PX-202), ammonium polyphosphate, melamine polyphosphate, DPPO (diphenylphosphine oxide) and its derivatives (such as di-DPPO compounds) or resins, melamine cyanurate, tri-hydroxy ethyl isocyanurate, aluminium phosphinate (e.g., commercially available OP-930 and OP-935) or a combination thereof.

For example, in one embodiment, the flame retardant may be a flame retardant commercially available from Katayama Chemical Industries Co., Ltd., such as but not limited to V1, V2, V3, V4, V5, V7, S-2, S-4, E-4c, E-7c, E-8g, E-9g, E-10g, E-100, B-3, W-1o, W-2h, W-2o, W-3o, W-4o, OX-1, OX-2, OX-4, OX-6, OX-6+, OX-7, OX-7+, OX-13, BPE-1, BPE-3, HyP-2, API-9, CMPO, ME-20, C-1R, C-iS, C-3R, C-3S or C-11R. The flame retardant of the present disclosure may include one or more of the above flame retardants.

The present disclosure preferably includes a phosphate ester flame retardant, such as but not limited to resorcinol bis(dixylenyl phosphate) or condensation polymer thereof, an unsaturated C═C double bond-containing phosphate ester or a combination thereof.

The unsaturated C═C double bond-containing phosphate ester described herein includes the structure shown as P1 below:

(P1)

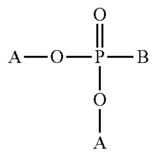

wherein A is independently an alkyl group with 1 to 3 carbon atoms, and B is an unsaturated C═C double bond-containing functional group, preferably, B being a vinyl group, a vinylbenzyl group, an allyl group or a butadienyl group. Examples of the unsaturated C═C double bond-containing phosphate ester include but are not limited to flame retardants under the product name S-2, V2 and B-3 available from Katayama Chemical Industries Co., Ltd.

For example, in one embodiment, relative to 100 parts by weight of the maleimide resin, the resin composition of the present disclosure may further comprise 1 part by weight to 15 parts by weight of a phosphate ester flame retardant, preferably 2 parts by weight to 10 parts by weight of a phosphate ester flame retardant.

For example, in one embodiment, a weight ratio of the compound of Formula (1) and the phosphate ester flame retardant is between 4:1 and 11:1. For example, a weight ratio of the compound of Formula (1) and the phosphate ester flame retardant is 4:1, 5.5:1, 6.6:1, 7:1, 8:1, 9:1, 10:1 or 11:1, but not limited thereto. The use of the compound of Formula (1) in combination with a phosphate ester flame retardant may further improve the dielectric aging properties of an article.

According to the present disclosure, for example, the curing accelerator different from the compound of Formula (2) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator different from the compound of Formula (2) also includes a curing initiator different from the compound of Formula (2), such as a peroxide capable of producing free radicals. The curing initiator comprises but is not limited to: dicumyl peroxide (DCP), tert-butyl peroxybenzoate, dibenzoyl peroxide (BPO), 2,5-dimethyl-2,5-di (tert-butylperoxy)-3-hexyne (25B), bis(tert-butylperoxyisopropyl) benzene or a combination thereof. For example, in one embodiment, relative to 100 parts by weight of the maleimide resin, the resin composition of the present disclosure may further comprise 0.001 part by weight to 5 parts by weight of a curing accelerator different from the compound of Formula (2), preferably 0.01 part by weight to 3.5 parts by weight of a curing accelerator different from the compound of Formula (2), more preferably 0.1 part by weight to 2.0 parts by weight of a curing accelerator different from the compound of Formula (2), but not limited thereto.

According to the present disclosure, for example, the polymerization inhibitor may comprise, but not limited to, 1,1-diphenyl-2-picrylhydrazyl radical, methyl acrylonitrile, nitroxide-mediated radical, triphenylmethyl radical, metal ion radical, sulfur radical (such as including but not limited to dithioester), hydroquinone, 4-methoxyphenol, p-benzoquinone, phenothiazine, 0-phenylnaphthylamine, 4-t-butylcatechol, methylene blue, 4,4'-butylidenebis(6-t-butyl-3-methylphenol) and 2,2'-methylenebis(4-ethyl-6-t-butylphenol) or a combination thereof. For example, the nitroxide-mediated radical may comprise, but not limited to, nitroxide radicals derived from cyclic hydroxylamines, such as 2,2,6,6-tetramethyl-1-oxo-piperidine, 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethylpyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like. For example, in one embodiment, relative to 100 parts by weight of the maleimide resin, the resin composition of the present disclosure may further comprise 0.001 part by weight to 20 parts by weight of a polymerization inhibitor, preferably 0.001 part by weight to 10 parts by weight of a polymerization inhibitor, but not limited thereto.

According to the present disclosure, for example, the solvent may be any solvents suitable for dissolving the resin composition of the present disclosure, including but not limited to: methanol, ethanol, ethylene glycol monomethyl ether, acetone, butanone (methyl ethyl ketone), methyl isobutyl ketone, cyclohexanone, N-methyl-pyrrolidone, toluene, xylene, methoxyethyl acetate, ethoxyethyl acetate, propoxyethyl acetate, ethyl acetate, dimethylformamide, dimethylacetamide, propylene glycol monomethyl ether acetate, or a mixture thereof. The amount of a solvent is added with the aim of fully dissolving the resin and achieving a specific total solid content of the resin composition. For example, in one embodiment, the amount of the solvent is added in order to adjust the total solid content of the resin composition to 50% to 85%, but not limited thereto.

According to the present disclosure, for example, the silane coupling agent may comprise silane (such as but not limited to siloxane), which may be further categorized according to the functional groups into amino silane, epoxide silane, vinyl silane, hydroxyl silane, isocyanate silane, methacryloxy silane and acryloxy silane. For example, in one embodiment, relative to 100 parts by weight of the maleimide resin, the resin composition of the present disclosure may further comprise 0.001 part by weight to 20 parts by weight of a silane coupling agent, preferably 0.01 part by weight to 10 parts by weight of a silane coupling agent, but not limited thereto.

According to the present disclosure, for example, the coloring agent may comprise but is not limited to dye or pigment. For example, in one embodiment, relative to 100 parts by weight of the maleimide resin, the resin composition of the present disclosure may further comprise 0.001 part by weight to 10 parts by weight of a coloring agent, preferably 0.01 part by weight to 5 parts by weight of a coloring agent, but not limited thereto.

According to the present disclosure, the main purpose of adding a toughening agent is to improve the toughness of the resin composition. For example, the toughening agent suitable for the present disclosure may comprise, but not limited to, carboxyl-terminated butadiene acrylonitrile rubber (CTBN rubber), core-shell rubber, ethylene propylene rubber or a combination thereof. For example, in one embodiment, relative to 100 parts by weight of the maleimide resin, the resin composition of the present disclosure may further comprise 1 part by weight to 20 parts by weight of a toughening agent, preferably 3 parts by weight to 10 parts by weight of a toughening agent, but not limited thereto.

The present disclosure further provides an article made from the aforesaid resin composition, such as an article suitable for use as components in electronic products, including but not limited to a prepreg, a resin film, a laminate or a printed circuit board.

For example, the resin composition of the disclosure can be used to make a prepreg, which comprises a reinforcement material and a layered structure disposed thereon. The layered structure is formed by heating the resin composition at a high temperature to the B-stage. Suitable baking temperature for making a prepreg may be for example 120° C. to 180° C., preferably 120° C. to 160° C. For example, the reinforcement material may be any one of a fiber material, woven fabric, and non-woven fabric, and the woven fabric preferably comprises fiberglass fabrics. The types of fiberglass fabrics are not particularly limited and may be any fiberglass fabric used for various printed circuit boards, such as E-glass fabric, D-glass fabric, S-glass fabric, T-glass fabric, L-glass fabric, Q-glass fabric or QL-glass fabric (glass fabric with hybrid structure made of Q-glass and L-glass); the fiber may comprise yarns and rovings, in spread form or standard form, and the shape of terminal face may be round or flat. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can also be optionally pre-treated by a silane coupling agent. The prepreg may be further heated and cured to the C-stage to form an insulation layer.

For example, the resin composition of the disclosure can be used to make a resin film, which is prepared by heating and baking to semi-cure the resin composition. The resin composition may be selectively coated on a liquid crystal polymer film, a polytetrafluoroethylene film, a polyethylene terephthalate film (PET film), a polyimide film (PI film), a copper foil or a resin-coated copper, followed by heating and baking to semi-cure the resin composition to form the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board. In one embodiment of making the printed circuit board according to the present disclosure, a double-sided copper-clad laminate (such as product EM-827, available from Elite Material Co., Ltd.) with a thickness of 28 mil and having a 1-ounce (oz) HTE (high temperature elongation) copper foil may be used and subjected to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit board, the prepreg and a copper foil stacked in said order by heating at 190° C. to 220° C. for 90 to 180 minutes to cure the insulation material of the prepregs. Next, black oxidation, drilling, copper plating and other known circuit board processes are performed on the outmost copper foils so as to obtain the printed circuit board.

For example, in one embodiment, the resin composition of the present disclosure and various articles made therefrom may preferably have any one, more or all of the following properties:

a thermal decomposition temperature as measured by reference to IPC-TM-650 2.4.24.6 of greater than or equal to 430° C., such as between 430° C. and 481° C.;

a percent of thermal expansion in Z-axis as measured by reference to IPC-TM-650 2.4.24.5 of less than or equal to 0.80%, such as between 0.43% and 0.80%;

a reflow shrinkage-stretch rate as measured by reference to IPC-TM-650 2.4.39 of less than or equal to 180 ppm, such as between 100 ppm and 180 ppm;

a flexural modulus as measured by reference to IPC-TM-650 2.4.4 of greater than or equal to 23.0 Gpa, such as between 23.0 GPa and 27.8 GPa; and a storage modulus decay rate as measured and calculated by reference to IPC-TM-650 2.4.24.4 of less than or equal to 26.3%, such as between 22.1% and 26.3%.

Raw materials below were used to prepare the resin compositions of various Examples and Comparative Examples of the present disclosure according to the amount listed in Table 1 to Table 5 and further fabricated to prepare test samples.

Materials and reagents used in Examples and Comparative Examples disclosed herein are listed below:

BMI-5100: 3,3'-dimethyl-5,5'-diethyl-4,4'-diphenylmethane bismaleimide, available from Daiwakasei Industry Co., Ltd.

BMI-2300: polyphenylmethane maleimide, available from Daiwakasei Industry Co., Ltd.

BMI-4000: bisphenol A diphenyl ether bismaleimide, available from Daiwakasei Industry Co., Ltd.

BMI-3000: maleimide containing aliphatic structure with 10 to 50 carbon atoms, available from Designer Molecules Inc.

BMI-1000: 4,4'-diphenylmethane bismaleimide, available from Daiwakasei Industry Co., Ltd.

Maleimide of Formula (3): commercially available.

Maleimide of Formula (4): commercially available.

Maleimide of Formula (5): commercially available.

Compound of Formula (1-1): prepared by the Applicant, as described in detail below.

Compound of Formula (1-2): prepared by the Applicant, as described in detail below.

Compound of Formula (1-4): prepared by the Applicant, as described in detail below.

Compound of Formula (1-9): prepared by the Applicant, as described in detail below.

Compound of Formula (2-1): 2,3-dimethyl-2,3-diphenylbutane, available from Wuxi Zhufeng Fine Chemical Co., Ltd.

Compound of Formula (2-2): 1,1,2,2-tetraphenylethane, available from Wuxi Zhufeng Fine Chemical Co., Ltd.

Compound of Formula (2-3): 1,2-di(p-tolyl)ethane, available from Wuxi Zhufeng Fine Chemical Co., Ltd.

Compound of Formula (2-4): prepared by the Applicant, as described in detail below.

Compound of Formula (2-5): prepared by the Applicant, as described in detail below.

Compound of Formula (2-6): prepared by the Applicant, as described in detail below.

SPV-100: allyl group-containing cyclophosphazene, available from Otsuka Chemical Co., Ltd.

Di-DOPO: di-9,10-dihydro-9-oxa-10-phosphaphenanthrene-10-oxide, as shown below, commercially available.

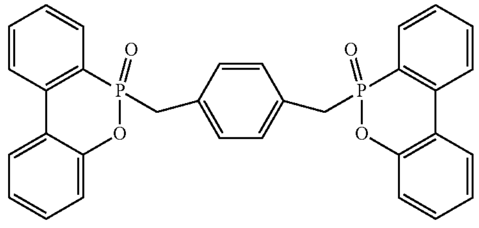 [SMILES: O=P1(Cc2ccc(CP3(=O)Oc4ccccc4-c4ccccc43)cc2)Oc2ccccc2-c2ccccc21]

PX-200: resorcinol bis(dixylenyl phosphate), available from Daihachi Chemical Industry Co., Ltd.

S-2: diethyl p-vinylbenzyl phosphate, available from Katayama Chemical Industries Co., Ltd.

DCP: dicumyl peroxide, available from NOF Corporation.

25B: 2,5-dimethyl-2,5-di(t-butylperoxy)-3-hexyne, available from NOF Corporation.

2E4MZ: 2-ethyl-4-methylimidazole, available from Kingyorker Enterprise Co., Ltd.

Trigonox-141: 2,5-di(2-ethylhexanoylperoxy)-2,5-dimethylhexane, commercially available.

DVB: divinylbenzene, available from Shanghai Macklin Biochemical Co., Ltd.

BVPE: bis(vinylphenyl)ethane, available from Linchuan Chemical Co., Ltd.

TAIC: triallyl isocyanurate, available from Kingyorker Enterprise Co., Ltd.

SC-2500-SVJ: spherical silica, available from Admatechs.

Toluene: available from Sinopec Group. The amount of toluene is shown as "PA" in the Tables to indicate a "proper amount" to represent an amount of toluene used to achieve a 60% to 68% solid content (S/C=60%-68%) of the whole resin composition.

Compositions and test results of resin compositions of Examples and Comparative Examples used herein are listed below:

TABLE 1

Compositions of resin compositions of Examples (in part by weight) and test results

| Component | | E1 | E2 | E3 | E4 | E5 |
|---|---|---|---|---|---|---|
| maleimide resin | Formula (3) | 100 | | | | |
| | Formula (4) | | 100 | | | |
| | BMI-5100 | | | 100 | | |
| | BMI-2300 | | | | 100 | |
| | BMI-4000 | | | | | 100 |
| | Formula (5) | | | | | |
| | BMI-3000 | | | | | |
| | BMI-1000 | | | | | |
| compound of Formula (1) | Formula (1-1) | 50 | 50 | 50 | | |
| | Formula (1-2) | | | | 50 | |
| | Formula (1-4) | | | | | 50 |
| | Formula (1-9) | | | | | |
| compound of Formula (2) | Formula (2-1) | 10 | | | 10 | 10 |
| | Formula (2-2) | | 10 | | | |
| | Formula (2-3) | | | 10 | | |
| | Formula (2-4) | | | | | |
| | Formula (2-5) | | | | | |
| | Formula (2-6) | | | | | |
| flame retardant different from the compound of Formula (1) | SPV-100 | | | | | |
| | Di-DOPO | | | | | |
| | PX-200 | | | | | |
| | S-2 | | | | | |
| curing accelerator different from the compound of Formula (2) | DCP | | | | | |
| | 25B | | | | | |
| | 2E4MZ | | | | | |
| | Trigonox-141 | | | | | |
| unsaturated C═C double bond-containing crosslinking agent | DVB | | | | | |
| | BVPE | | | | | |
| | TAIC | | | | | |
| inorganic filler | SC-2500-SVJ | 140 | 140 | 140 | 140 | 140 |
| solvent | toluene | PA | PA | PA | PA | PA |
| Item | Unit | E1 | E2 | E3 | E4 | E5 |
| thermal decomposition temperature | ° C. | 445 | 450 | 455 | 450 | 455 |
| percent of thermal expansion in Z-axis | % | 0.70 | 0.72 | 0.68 | 0.65 | 0.67 |
| reflow shrinkage-stretch rate | ppm | 160 | 162 | 150 | 145 | 154 |
| flexural modulus | GPa | 25.0 | 23.6 | 25.2 | 26.1 | 25.8 |
| storage modulus decay rate | % | 25.4 | 25.0 | 24.2 | 24.5 | 24.8 |

TABLE 2

Compositions of resin compositions of Examples (in part by weight) and test results

| Component | | E6 | E7 | E8 | E9 | E10 |
|---|---|---|---|---|---|---|
| maleimide resin | Formula (3) | | 100 | 100 | 100 | 100 |
| | Formula (4) | | | | | |
| | BMI-5100 | | | | | |
| | BMI-2300 | | | | | |
| | BMI-4000 | | | | | |
| | Formula (5) | 100 | | | | |
| | BMI-3000 | | | | | |
| | BMI-1000 | | | | | |
| compound of Formula (1) | Formula (1-1) | | 30 | 120 | 50 | 50 |
| | Formula (1-2) | | | | | |
| | Formula (1-4) | | | | | |
| | Formula (1-9) | 50 | | | | |
| compound of Formula (2) | Formula (2-1) | 10 | 10 | 10 | 3 | 20 |
| | Formula (2-2) | | | | | |
| | Formula (2-3) | | | | | |
| | Formula (2-4) | | | | | |
| | Formula (2-5) | | | | | |
| | Formula (2-6) | | | | | |
| flame retardant different from the compound of Formula (1) | SPV-100 | | | | | |
| | Di-DOPO | | | | | |
| | PX-200 | | | | | |
| | S-2 | | | | | |

TABLE 2-continued

Compositions of resin compositions of Examples (in part by weight) and test results

| Component | | E6 | E7 | E8 | E9 | E10 |
|---|---|---|---|---|---|---|
| curing accelerator different from the compound of Formula (2) | DCP | | | | | |
| | 25B | | | | | |
| | 2E4MZ | | | | | |
| | Trigonox-141 | | | | | |
| unsaturated C═C double bond-containing crosslinking agent | DVB | | | | | |
| | BVPE | | | | | |
| | TAIC | | | | | |
| inorganic filler | SC-2500-SVJ | 140 | 140 | 140 | 140 | 140 |
| solvent | toluene | PA | PA | PA | PA | PA |
| Item | Unit | E6 | E7 | E8 | E9 | E10 |
| thermal decomposition temperature | ° C. | 448 | 440 | 468 | 440 | 435 |
| percent of thermal expansion in Z-axis | % | 0.66 | 0.75 | 0.73 | 0.75 | 0.79 |
| reflow shrinkage-stretch rate | ppm | 150 | 170 | 165 | 165 | 180 |
| flexural modulus | GPa | 25.6 | 23.3 | 24.5 | 23.5 | 24.0 |
| storage modulus decay rate | % | 26.0 | 26.2 | 25.6 | 25.9 | 26.3 |

TABLE 3

Compositions of resin compositions of Examples (in part by weight) and test results

| Component | | E11 | E12 | E13 | E14 | E15 |
|---|---|---|---|---|---|---|
| maleimide resin | Formula (3) | 100 | 100 | 100 | 10 | 65 |
| | Formula (4) | | | | | 10 |
| | BMI-5100 | | | | 80 | |
| | BMI-2300 | | | | | 10 |
| | BMI-4000 | | | | | 10 |
| | Formula (5) | | | | | |
| | BMI-3000 | | | | 10 | |
| | BMI-1000 | | | | | 5 |
| compound of Formula (1) | Formula (1-1) | | 50 | | 70 | 40 |
| | Formula (1-2) | 30 | | | | 30 |
| | Formula (1-4) | | | 120 | | 20 |
| | Formula (1-9) | | | | | |
| compound of Formula (2) | Formula (2-1) | | | | 8 | |
| | Formula (2-2) | | | | | |
| | Formula (2-3) | | | | | |
| | Formula (2-4) | 3 | | | | |
| | Formula (2-5) | | 10 | | | 5 |
| | Formula (2-6) | | | 20 | | 10 |
| flame retardant different from the compound of Formula (1) | SPV-100 | | | | | |
| | Di-DOPO | | | | | |
| | PX-200 | | | | | 3 |
| | S-2 | | | | 5 | 2 |
| curing accelerator different from the compound of Formula (2) | DCP | | | | 2 | |
| | 25B | | | | | |
| | 2E4MZ | | | | | |
| | Trigonox-141 | | | | | |
| unsaturated C═C double bond-containing crosslinking agent | DVB | | | | 2 | |
| | BVPE | | | | | 2 |
| | TAIC | | | | | 5 |
| inorganic filler | SC-2500-SVJ | 140 | 140 | 140 | 80 | 250 |
| solvent | toluene | PA | PA | PA | PA | PA |
| Item | Unit | E11 | E12 | E13 | E14 | E15 |
| thermal decomposition temperature | ° C. | 458 | 465 | 470 | 430 | 481 |
| percent of thermal expansion in Z-axis | % | 0.53 | 0.43 | 0.57 | 0.80 | 0.50 |
| reflow shrinkage-stretch rate | ppm | 135 | 120 | 130 | 170 | 100 |
| flexural modulus | GPa | 26.5 | 27.0 | 26.8 | 23.0 | 27.8 |
| storage modulus decay rate | % | 22.5 | 22.1 | 23.0 | 25.7 | 22.2 |

TABLE 4

Compositions of resin compositions of Comparative Examples (in part by weight) and test results

| Component | | C1 | C2 | C3 | C4 | C5 |
| --- | --- | --- | --- | --- | --- | --- |
| maleimide resin | Formula (3) | 100 | 100 | 100 | 100 | 100 |
| | Formula (4) | | | | | |
| | BMI-5100 | | | | | |
| | BMI-2300 | | | | | |
| | BMI-4000 | | | | | |
| | Formula (5) | | | | | |
| | BMI-3000 | | | | | |
| | BMI-1000 | | | | | |
| compound of Formula (1) | Formula (1-1) | 20 | 130 | 50 | 50 | 50 |
| | Formula (1-2) | | | | | |
| | Formula (1-4) | | | | | |
| | Formula (1-9) | | | | | |
| compound of Formula (2) | Formula (2-1) | 10 | 10 | 0 | 25 | |
| | Formula (2-2) | | | | | |
| | Formula (2-3) | | | | | |
| | Formula (2-4) | | | | | |
| | Formula (2-5) | | | | | |
| | Formula (2-6) | | | | | |
| flame retardant different from the compound of Formula (1) | SPV-100 | | | | | |
| | Di-DOPO | | | | | |
| | PX-200 | | | | | |
| | S-2 | | | | | |
| curing accelerator different from the compound of Formula (2) | DCP | | | | | 10 |
| | 25B | | | | | |
| | 2E4MZ | | | | | |
| | Trigonox-141 | | | | | |
| unsaturated C═C double bond-containing crosslinking agent | DVB | | | | | |
| | BVPE | | | | | |
| | TAIC | | | | | |
| inorganic filler | SC-2500-SVJ | 140 | 140 | 140 | 140 | 140 |
| solvent | toluene | PA | PA | PA | PA | PA |
| Item | Unit | C1 | C2 | C3 | C4 | C5 |
| thermal decomposition temperature | ° C. | 420 | 460 | 425 | 416 | 418 |
| percent of thermal expansion in Z-axis | % | 0.95 | 0.90 | 1.03 | 1.00 | 1.02 |
| reflow shrinkage-stretch rate | ppm | 240 | 210 | 300 | 290 | 310 |
| flexural modulus | GPa | 22.2 | 21.8 | 22.0 | 21.5 | 20.0 |
| storage modulus decay rate | % | 31.2 | 29.3 | 30.2 | 31.8 | 32.1 |

TABLE 5

Compositions of resin compositions of Comparative Examples (in part by weight)

| Component | | C6 | C7 | C8 | C9 | C10 |
| --- | --- | --- | --- | --- | --- | --- |
| maleimide resin | Formula (3) | 100 | 100 | 100 | 100 | 100 |
| | Formula (4) | | | | | |
| | BMI-5100 | | | | | |
| | BMI-2300 | | | | | |
| | BMI-4000 | | | | | |
| | Formula (5) | | | | | |
| | BMI-3000 | | | | | |
| | BMI-1000 | | | | | |
| compound of Formula (1) | Formula (1-1) | 50 | 50 | 50 | | |
| | Formula (1-2) | | | | | |
| | Formula (1-4) | | | | | |
| | Formula (1-9) | | | | | |
| compound of Formula (2) | Formula (2-1) | | | | 10 | 10 |
| | Formula (2-2) | | | | | |
| | Formula (2-3) | | | | | |
| | Formula (2-4) | | | | | |
| | Formula (2-5) | | | | | |
| | Formula (2-6) | | | | | |

TABLE 5-continued

Compositions of resin compositions of Comparative Examples (in part by weight)

| Component | | C6 | C7 | C8 | C9 | C10 |
|---|---|---|---|---|---|---|
| flame retardant different from the compound of Formula (1) | SPV-100 | | | | 50 | |
| | Di-DOPO | | | | | 50 |
| | PX-200 | | | | | |
| | S-2 | | | | | |
| curing accelerator different from the compound of Formula (2) | DCP | | | | | |
| | 25B | 10 | | | | |
| | 2E4MZ | | 10 | 5 | | |
| | Trigonox-141 | | | 5 | | |
| unsaturated C═C double bond-containing crosslinking agent | DVB | | | | | |
| | BVPE | | | | | |
| | TAIC | | | | | |
| inorganic filler | SC-2500-SVJ | 140 | 140 | 140 | 140 | 140 |
| solvent | toluene | PA | PA | PA | PA | PA |
| Item | Unit | C6 | C7 | C8 | C9 | C10 |
| thermal decomposition temperature | ° C. | 420 | 415 | 413 | 405 | 410 |
| percent of thermal expansion in Z-axis | % | 1.01 | 0.98 | 1.00 | 1.60 | 1.52 |
| reflow shrinkage-stretch rate | ppm | 315 | 350 | 340 | 390 | 400 |
| flexural modulus | GPa | 21.1 | 21.9 | 22.1 | 19.8 | 21.3 |
| storage modulus decay rate | % | 33.0 | 31.2 | 32.8 | 42.1 | 44.6 |

For example, in one embodiment, the compound of Formula (1) is prepared by using the following processes.

Preparation Example 1 Compound of Formula (1-1)

31.2 g of NaH and 400 mL of anhydrous tetrahydrofuran were added to a 1 L three-necked flask, introduced with nitrogen gas, and the temperature was increased to 50° C. with stirring. 75.2 g of p-hydroxybenzaldehyde was dissolved in 200 mL of anhydrous tetrahydrofuran, which was added slowly to the three-necked flask. After the addition was completed, the reaction was continued for 4 hours. 34.7 g of hexachlorocyclotriphosphazene was dissolved in 200 mL of anhydrous tetrahydrofuran, which was added to the three-necked flask. The mixture was heated to 65° C. and reacted for 48 hours, followed by filtration and rotary evaporation so as to obtain an intermediate.

At room temperature, 350 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide. After 2 hours of reaction, 600 g of calcium bromide was added, stirred and reacted for 24 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-1), having a pH value of 8 and a structure as shown below.

Formula (1-1)

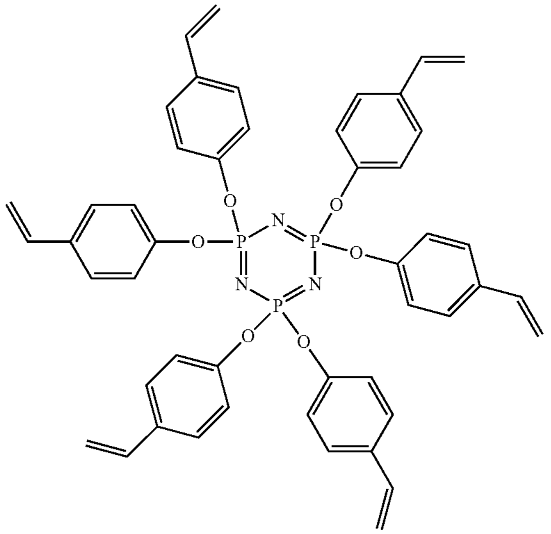

Preparation Example 2 Compound of Formula (1-2)

3.12 g of NaH and 400 mL of anhydrous tetrahydrofuran were added to a 1 L three-necked flask, introduced with nitrogen gas, and the temperature was increased to 50° C. with stirring. 75.2 g of o-hydroxybenzaldehyde was dissolved in 200 mL of anhydrous tetrahydrofuran, which was added slowly to the three-necked flask. After the addition was completed, the reaction was continued for 4 hours. 34.7 g of hexachlorocyclotriphosphazene was dissolved in 200 mL of anhydrous tetrahydrofuran, which was added to the three-necked flask. The mixture was heated to 65° C. and reacted for 48 hours, followed by filtration and rotary evaporation so as to obtain an intermediate.

At room temperature, 350 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide.

After 3 hours of reaction, 600 g of calcium bromide was added, stirred and reacted for 30 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-2), having a pH value of 8 and a structure as shown below.

Formula (1-2)

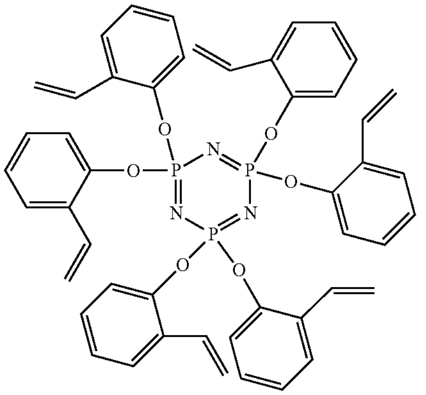

Preparation Example 3 Compound of Formula (1-3)

At room temperature, 100 g of hexachlorocyclotriphosphazene, 270 g of potassium carbonate and 400 mL of tetrahydrofuran were added to a three-necked flask. After fully dissolving the mixture, the three-necked flask was moved to an iced water bath and added slowly with 37 g of o-hydroxybenzaldehyde, which was completed in 2 hours, followed by heating to 40° C. and reacting for 72 hours. Then 366 mL of a tetrahydrofuran solution of p-hydroxybenzaldehyde at a concentration of 0.5 g/mL was added dropwise to the three-necked flask, which was reacted for 48 hours, filtered and rotarily evaporated so as to obtain an intermediate.

At room temperature, 315 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide. After 2 hours of reaction, 600 g of calcium bromide was added, stirred and reacted for 24 hours, followed by adding an acetic acid aqueous solution to adjust the pH value to 4 to 5 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-3), having a pH value of 5 and a structure as shown below.

Formula (1-3)

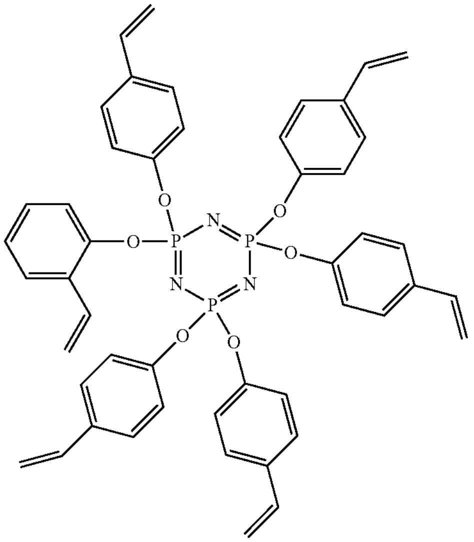

Preparation Example 4 Compound of Formula (1-4)

At room temperature, 100 g of hexachlorocyclotriphosphazene, 198 g of triethylamine and 400 mL of tetrahydrofuran were added to a three-necked flask. After fully dissolving the mixture, the three-necked flask was moved to an iced water bath and added slowly with 110 g of o-hydroxybenzaldehyde, which was completed in 2 hours, followed by heating to 50° C. and reacting for 64 hours. Then 220 mL of a tetrahydrofuran solution of p-hydroxybenzaldehyde at a concentration of 0.5 g/mL was added dropwise to the three-necked flask, which was reacted for 60 hours, filtered and rotarily evaporated so as to obtain an intermediate.

At room temperature, 350 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide. After 2 hours of reaction, 600 g of calcium bromide was added, stirred and reacted for 24 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-4), having a pH value of 8 and a structure as shown below.

Formula (1-4)

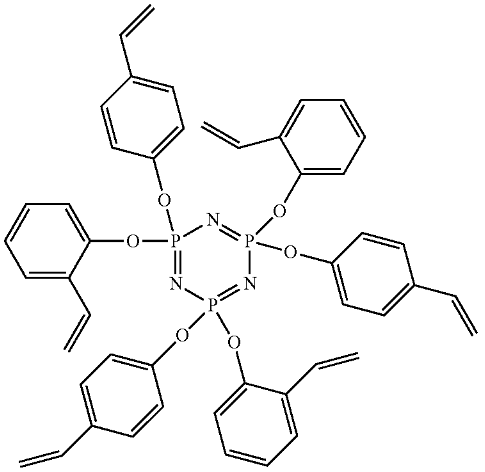

Formula (1-5)

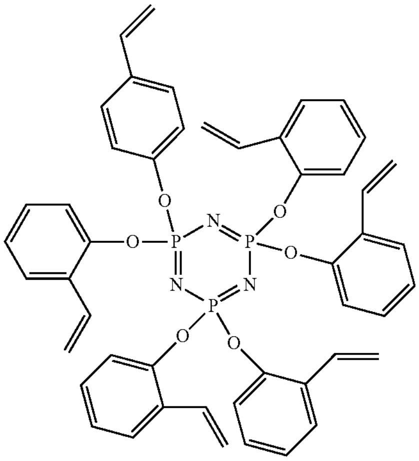

Preparation Example 5 Compound of Formula (1-5)

At room temperature, 100 g of hexachlorocyclotriphosphazene, 270 g of potassium carbonate and 400 mL of tetrahydrofuran were added to a three-necked flask. After fully dissolving the mixture, the three-necked flask was moved to an iced water bath and added slowly with 183 g of o-hydroxybenzaldehyde, which was completed in 2 hours, followed by heating to 60° C. and reacting for 56 hours. Then 73 mL of a tetrahydrofuran solution of p-hydroxybenzaldehyde at a concentration of 0.5 g/mL was added dropwise to the three-necked flask, which was reacted for 72 hours, filtered and rotarily evaporated so as to obtain an intermediate.

At room temperature, 400 g of dehydrated methyltriphenylphosphonium bromide and 550 mL of a dehydrated tetrahydrofuran solution of the intermediate at a concentration of 0.17 g/mL were added to a three-necked flask, stirred and added slowly with 48 g of sodium methoxide. After 2 hours of reaction, 600 g of calcium bromide was added, stirred and reacted for 24 hours, followed by adding an ammonium chloride aqueous solution to adjust the pH value to 9 to 10 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-5), having a pH value of 10 and a structure as shown below.

Preparation Example 6 Compound of Formula (1-6)

At room temperature, 134 g of octachlorocyclotetraphosphazene, 359 g of potassium carbonate and 400 mL of tetrahydrofuran were added to a three-necked flask. After fully dissolving the mixture, the three-necked flask was moved to an iced water bath and added slowly with 147 g of o-hydroxybenzaldehyde, which was completed in 2 hours, followed by heating to 70° C. and reacting for 48 hours. Then 294 mL of a tetrahydrofuran solution of p-hydroxybenzaldehyde at a concentration of 0.5 g/mL was added dropwise to the three-necked flask, which was reacted for 48 hours, filtered and rotarily evaporated so as to obtain an intermediate.

At room temperature, 315 g of dehydrated methyltriphenylphosphonium bromide and 500 mL of a dehydrated tetrahydrofuran solution of the intermediate at a concentration of 0.17 g/mL were added to a three-necked flask, stirred and added slowly with 135 g of potassium tert-butoxide. After 3 hours of reaction, 700 g of calcium bromide was added, stirred and reacted for 48 hours, followed by adding an acetic acid aqueous solution to adjust the pH value to 7 to 8 and rotary evaporation to remove the tetrahydrofuran in the system. The mixture was added with dichloroethane, separated as liquids, and the oil phase was collected. After rotary evaporation for removing dichloroethane, a mixture solution of cyclohexane and dichloroethane was used as the mobile phase (cyclohexane:dichloroethane=500:1 to 10:1) for separation and purification through a silica gel chromatography column so as to obtain a product, marked as a compound of Formula (1-6), having a pH value of 8 and a structure as shown below.

Formula (1-6)

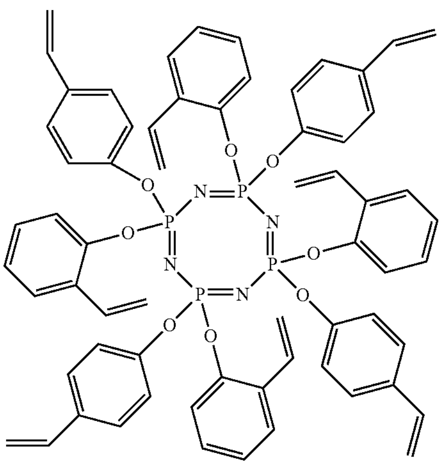

Preparation Example 7 Compound of Formula (1-7)

At room temperature, 168 g of decachlorocyclopentaphosphazene, 442 g of potassium carbonate and 400 mL of tetrahydrofuran were added to a three-necked flask. After fully dissolving the mixture, the three-necked flask was moved to an iced water bath and added slowly with 183 g of o-hydroxybenzaldehyde, which was completed in 2 hours, followed by heating to 70° C. and reacting for 48 hours. Then 366 mL of a tetrahydrofuran solution of p-hydroxybenzaldehyde at a concentration of 0.5 g/mL was added dropwise to the three-necked flask, which was reacted for 48 hours, filtered and rotarily evaporated so as to obtain an intermediate.

At room temperature, 315 g of dehydrated methyltriphenylphosphonium bromide and 500 mL of a dehydrated tetrahydrofuran solution of the intermediate at a concentration of 0.17 g/mL were added to a three-necked flask, stirred and added slowly with 170 g of potassium tert-butoxide. After 3 hours of reaction, 600 g of calcium bromide was added, stirred and reacted for 36 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-7), having a pH value of 8 and a structure as shown below. Formula (1-7)

Formula (1-7)

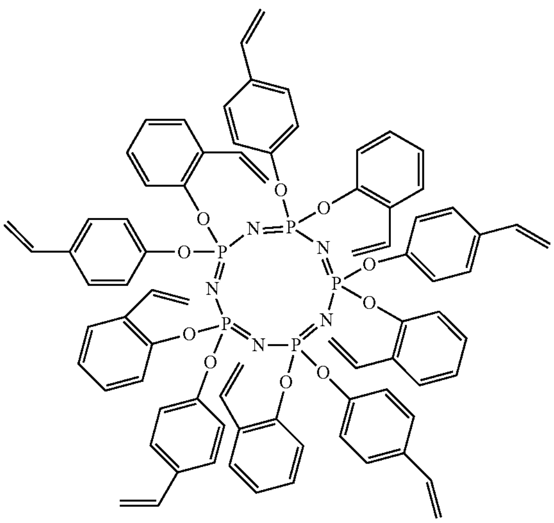

Preparation Example 8 Compound of Formula (1-8

At room temperature, 201 g of dodecachlorocyclohexaphosphazene, 525 g of potassium carbonate and 400 mL of tetrahydrofuran were added to a three-necked flask. After fully dissolving the mixture, the three-necked flask was moved to an iced water bath and added slowly with 220 g of o-hydroxybenzaldehyde, which was completed in 2 hours, followed by heating to 70° C. and reacting for 48 hours. Then 440 mL of a tetrahydrofuran solution of p-hydroxybenzaldehyde at a concentration of 0.5 g/mL was added dropwise to the three-necked flask, which was reacted for 60 hours, filtered and rotarily evaporated so as to obtain an intermediate.

At room temperature, 315 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide. After 3 hours of reaction, 600 g of calcium bromide was added, stirred and reacted for 24 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation to remove ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-8), having a pH value of 8 and a structure as shown below.

Formula (1-8)

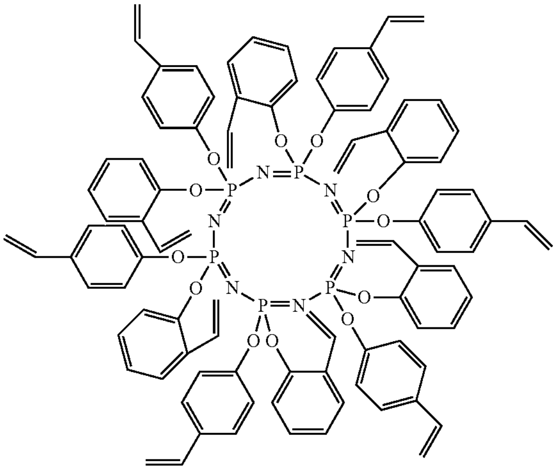

Preparation Example 9 Compound of Formula (1-9)

At room temperature, 100 g of hexachlorocyclotriphosphazene, 198 g of triethylamine and 400 mL of tetrahydrofuran were added to a three-necked flask. After fully dissolving the mixture, the three-necked flask was moved to an iced water bath and added slowly with 110 g of o-hydroxybenzaldehyde, which was completed in 2 hours, followed by heating to 50° C. and reacting for 64 hours. Then 220 mL of a tetrahydrofuran solution of m-hydroxybenzaldehyde at a concentration of 0.5 g/mL was added dropwise to the three-necked flask, which was reacted for 60 hours, filtered and rotarily evaporated so as to obtain an intermediate.

At room temperature, 350 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide. After 2 hours of reaction, 600 g of calcium bromide was added, stirred and reacted for 24 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-9), having a pH value of 8 and a structure as shown below.

Formula (1-9)

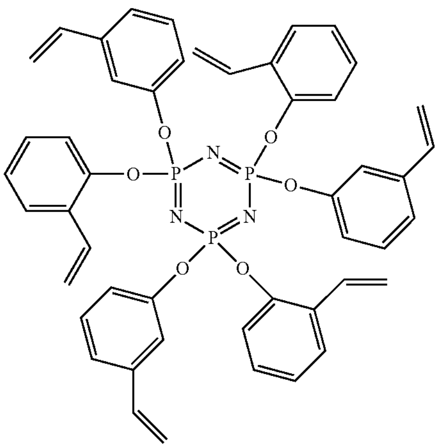

Preparation Example 10 Compound of Formula (1-10)

At room temperature, 100 g of hexachlorocyclotriphosphazene, 198 g of triethylamine and 400 mL of tetrahydrofuran were added to a three-necked flask. After fully dissolving the mixture, the three-necked flask was moved to an iced water bath and added slowly with 73 g of o-hydroxybenzaldehyde, which was completed in 2 hours, followed by heating to 50° C. and reacting for 64 hours. Then 146 mL of a tetrahydrofuran solution of p-hydroxybenzaldehyde at a concentration of 0.5 g/mL was added dropwise to the three-necked flask, reacted for 60 hours. After that, 146 mL of m-hydroxybenzaldehyde at a concentration of 0.5 g/mL was added dropwise to the three-necked flask, reacted for 60 hours, filtered and rotarily evaporated to obtain an intermediate.

At room temperature, 350 g of dehydrated methyltriphenylphosphonium bromide and 500 mL of a dehydrated tetrahydrofuran solution of the intermediate at a concentration of 0.17 g/mL were added to a three-necked flask, stirred and added slowly with 100 g of potassium tert-butoxide. After 2 hours of reaction, 600 g of calcium bromide was added, stirred and reacted for 24 hours, followed by adding an acetic acid aqueous solution to adjust the pH value to 7 to 8 and rotary evaporation to remove the tetrahydrofuran in the system. The mixture was added with ethyl acetate, separated as liquids, and the oil phase was collected. After rotary evaporation for removing ethyl acetate, a mixture solution of cyclohexane and ethyl acetate was used as the mobile phase (cyclohexane:ethyl acetate=500:1 to 10:1) for separation and purification through a silica gel chromatography column so as to obtain a product, marked as a compound of Formula (1-10), having a pH value of 8 and a structure as shown below.

Formula (1-10)

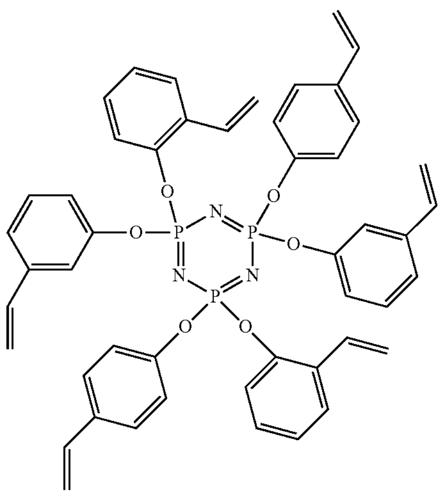

For example, in one embodiment, the compound of Formula (2) is prepared by using the following processes.

Preparation Example 11 Compound of Formula (2-4)

In a three-necked flask under nitrogen protection, 1 mol of 1,1'-bis(4-bromophenyl)ethane, 1.2 mol of vinylmagnesium bromide in a tetrahydrofuran solution and 0.05 mol of palladium dichloride were added in such order and refluxed for 24 hours. A saturated aqueous ammonium chloride solution was added to quench the reaction, which was then extracted with a dichloromethane solution. The organic phases were combined and evaporated to remove the solvent so as to obtain a crude product, which was separated by column chromatography to obtain 0.9 mol of 1,1'-bis(4-vinylphenyl)ethane.

In a three-necked flask, 0.8 mol of 1,1'-bis(4-vinylphenyl) ethane, 1.6 mol of N-bromosuccinimide, 0.05 mol of dibenzoyl peroxide and an appropriate amount of carbon tetrachloride were added in such order and refluxed for 12 hours. The reaction solution was washed three times with a sodium thiosulfate solution, and the solvent was evaporated to obtain a dry powder solid, which was recrystallized by acetone to obtain 1,1'-bis(4-vinylphenyl)-1-bromoethane.

In a reaction flask, 0.5 mol of 1,1'-bis(4-vinylphenyl)-1-bromoethane and 1 mol of silver-activated zinc powder were added in such order and reacted for 2 hours. After cooling to room temperature, saturated ammonium chloride was used to quench the reaction, which was filtered to remove unreacted zinc powder and separated by column chromatography to obtain 2,3-tetra(4-vinylphenyl)butane, marked as a compound of Formula (2-4), as shown below.

Formula (2-4)

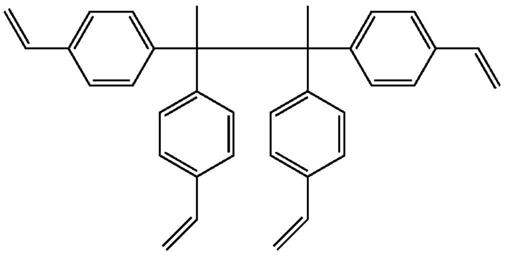

Preparation Example 12 Compound of Formula (2-5)

In a reaction flask, 0.01 mol of 4-isopropylbenzaldehyde, 0.02 mol of N-bromosuccinimide, 0.05 mol of dibenzoyl peroxide and 10 ml of carbon tetrachloride were added and refluxed for 12 hours. After concentrated, the product was purified by a chromatography column to obtain 2-bromo-2-(4-formylphenyl)propane.

In a reaction flask, 0.01 mol of 2-bromo-2-(4-formylphenyl)propane and 0.02 mol of silver-activated zinc powder were added and reacted for 2 hours. The mixture was filtered to remove unreacted zinc powder and purified by a chromatography column to obtain 2,3-dimethyl-2,3-bis(4-formylphenyl)butane.

Tetrahydrofuran was added with anhydrous calcium chloride and stood still overnight to remove water. In a four-necked flask, 0.01 mol of 2,3-dimethyl-2,3-bis(4-formylphenyl)butane, 0.015 mol of methyltriphenylphosphonium bromide and 15 mL of tetrahydrofuran were added, and 0.015 mol of potassium tert-butoxide was added slowly under an iced water bath condition and reacted at room temperature for 2 hours. A saturated ammonium chloride aqueous solution was added to inactivate phosphorus ylide and filtered to remove excess salt to obtain a filtrate, which was added with 0.03 mol of calcium bromide, stirred for 18 hours and filtered so as to obtain a crude product, which was purified by a chromatography column to obtain 2,3-dimethyl-2,3-bis(4-vinylphenyl)butane, marked as a compound of Formula (2-5), as shown below.

Formula (2-5)

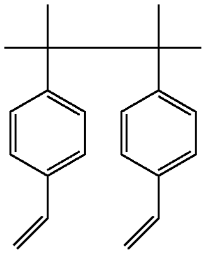

Preparation Example 13 Compound of Formula (2-6)

Under nitrogen gas protection, 0.6 mol of acetophenone in a tetrahydrofuran solution was added to a three-necked flask, which was added dropwise with 1.8 mol of titanium tetrachloride in an iced bath. After the dropwise addition was completed, the reaction was stirred at room temperature for 10 minutes and refluxed for 12 hours. After the reaction was completed, as confirmed by TLC, it was cooled to room temperature and added with a potassium carbonate solution to precipitate. The precipitate was filtered to obtain a filter cake, which was then extracted with dichloromethane. Finally, the solvent was evaporated to obtain 0.25 mol of 1,2-dimethylstilbene.

In a three-necked flask, 0.24 mol of peroxybenzoate in a dichloromethane solution was added dropwise to 0.2 mol of 1,2-dimethylstilbene in a dichloromethane solution under an iced bath. After the dropwise addition was completed, the reaction was carried out at room temperature for 24 hours and completed, as confirmed by TLC. The organic phase was extracted with a sodium thiosulfate solution and a sodium bicarbonate solution in sequence, and the solvent was evaporated to obtain a dry powder solid, which was recrystallized by acetone to obtain 0.16 mol of 1,2-dimethylstilbene epoxide.

In a three-necked flask, 0.15 mol of 1,2-dimethylstilbene epoxide in a tetrahydrofuran solution was added, and 0.6 mol of a 10% sulfuric acid solution was added at room temperature. After refluxing for 8 hours. the reaction was completed. The reaction solution was poured into 5 liters of cold water to precipitate a solid, which was filtered to obtain a filter cake. After recrystallization by ethanol, 0.14 mol of 1,2-dimethyldiphenylbutanediol was obtained.

0.1 mol of 1,2-dimethyldiphenylbutanediol, 0.15 mol of methacryloyl chloride and toluene were added in such order to a three-necked flask equipped with a water separator, and 0.01 mol of concentrated sulfuric acid was added. After refluxing for 24 hours, the reaction solution was neutralized with a 10% sodium hydroxide solution, extracted with ethyl acetate and washed with saturated brine. The solvent was evaporated to obtain a dry powder solid, which was recrystallized by isopropanol/n-hexane to obtain 0.08 mol of 2,3-diphenylbutane-2,3-dimethylbis(2-methacrylate), marked as a compound of Formula (2-6), as shown below.

Formula (2-6)

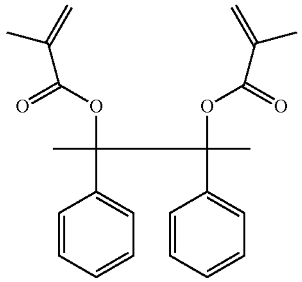

For the property tests of Examples and Comparative Examples of the present disclosure, samples (specimens) were prepared as described below and tested under specified conditions below.

(1) Prepreg: Resin composition from each Example or each Comparative Example was individually well-mixed to form a varnish, which was then loaded to an impregnation tank; a fiberglass fabric (e.g., 2116 L-glass fiber fabric or 1080 L-glass fiber fabric, all available from Asahi) was impregnated into the impregnation tank to adhere the resin composition onto the fiberglass fabric, followed by heating at 150° C. to 170° C. to a semi-cured stage (B-stage) to obtain a prepreg.

(2) Copper-clad laminate (8-ply, formed by lamination of eight prepregs): Two 18 m HVLP (hyper very low profile) copper foils and eight prepregs obtained from 2116 L-glass fiber fabrics impregnated with each Example or Comparative Example and having a resin content of about 53% were prepared. An HVLP copper foil, 8 prepregs and an HVLP copper foil were superimposed in such order and then subjected to a vacuum condition for lamination at 420 psi and 200° C. for 2 hours to form each copper-clad laminate, wherein insulation layers between the two copper foils were formed by laminating and curing eight sheets of prepreg, the resin content of the insulation layers being about 53%.

(3) Copper-free laminate (8-ply, formed by lamination of eight prepregs): Each aforesaid copper-clad laminate (8-ply) was etched to remove the two copper foils to obtain a copper-free laminate (8-ply), which is formed by laminating eight sheets of prepreg and has a resin content of about 53%.

(4) Ten-layer board: An EM-LX copper-containing laminate (available from Elite Material Co., Ltd., 3 mil in thickness, using 1078 E-glass fiber fabric and 18 μm HTE copper foil) was subjected to trace formation processes on the surface of copper foils, including such as conventional exposure, lithography, etching, etc., to obtain a core. After obtaining the core, preparing a second prepreg from the resin composition of each Example or Comparative Example using 1027 L-glass fiber fabric; placing a second prepreg on both sides of the core and covering a 18 μm HTE copper foil on the other side of the second prepreg opposite to the core, followed by lamination and curing in vacuum at high temperature (200° C.) and high pressure (360 psi) for 2 hours to complete the first lamination. After that, a drilling process was performed to make alignment holes, and then hole metallization process and trace formation process were performed to complete the first build-up step to obtain a four-layer board. The build-up processes were repeated to form a six-layer board (second build-up, second lamination), an eight-layer board (third build-up, third lamination), and finally a ten-layer board (fourth build-up, fourth lamination).

Test items and test methods of each sample are described as below.

1. Thermal Decomposition Temperature (Td)

Each copper-free laminate was used to prepare a sample (25 mg), which was measured by the TGA test method by reference to IPC-TM-650 2.4.24.6 with a temperature increase rate of 10° C./minute and a final temperature of 600° C. The temperature at 5% thermal weight loss is the thermal decomposition temperature. When the thermal decomposition temperature is greater than or equal to 400° C., a relative difference in the thermal decomposition temperature of greater than or equal to 1% represents a substantial difference (i.e., significant technical difficulty) in different samples.

2. Percent of Thermal Expansion in Z-Axis (Z-PTE)

The copper-free laminate sample was subjected to thermal mechanical analysis (TMA) by reference to IPC-TM-650 2.4.24.5. Each sample was heated from 50° C. to 260° C. at a heating rate of 10° C./minute and then subjected to the measurement of percent (%) of thermal expansion in Z-axis in a temperature range of 50° C. to 260° C. When the percent of thermal expansion in Z-axis is less than or equal to 1%, a relative difference in the percent of thermal expansion in Z-axis of greater than or equal to 2% represents a substantial difference (i.e., significant technical difficulty) in different samples.

3. Reflow Shrinkage-Stretch Rate

Each ten-layer board sample (6 inches in length and 3 inches in width) was measured by a 3D measuring instrument to obtain the distance (L1) between the target points at four corners of each sample. After reflowing each sample at 260° C. for 3 times, the 3D measuring instrument was used again to measure the distance (L2) between the target points at four corners of each sample. The reflow shrinkage-stretch rate was then calculated by reference to IPC-TM-650 2.4.39 as follows: Reflow shrinkage-stretch rate (in ppm)=(L1−L2)/L1. A relative difference in reflow shrinkage-stretch rate of greater than or equal to 3% represents a substantial difference (i.e., significant technical difficulty) in different samples.

4. Flexural Modulus

Each copper-free laminate sample (3 inches in length and 1 inch in width) was subjected to the measurement of flexural modulus (in GPa) by using a universal tester by reference to IPC-TM-650 2.4.4. When the flexural modulus is greater than or equal to 23.0 GPa, a relative difference in flexural modulus of greater than or equal to 1% represents a substantial difference (i.e., significant technical difficulty) in different samples.

5. Storage Modulus Decay Rate

The copper-free laminate sample was subjected to the measurement of storage modulus using a dynamic mechanical analyzer (DMA) by reference to IPC-TM-650 2.4.24.4, wherein the temperature interval during the measurement was set at 50 to 400° C. with a temperature increase rate of 2° C./minute. The storage modulus (in MPa) of the sample at 50° C. is recorded and designated as $E'_{50}$, and the storage modulus (in MPa) of the sample at 250° C. is recorded and designated as $E'_{250}$. The storage modulus decay rate can be calculated as follow: $((E'_{50}-E'_{250})/E'_{50})*100\%$. A relative difference in storage modulus decay rate of greater than or equal to 2% represents a substantial difference (i.e., significant technical difficulty) between different samples.

The following observations can be made from Table 1 to Table 5.

From Examples E1 to E15, it can be determined that the resin composition of the present disclosure and an article made therefrom may achieve improvements in the following one or more or all properties including: thermal decomposition temperature, percent of thermal expansion in Z-axis, reflow shrinkage-stretch rate, flexural modulus and storage modulus decay rate.

Examples E1 to E10 and E14 contain a saturated compound of Formula (2), specifically a compound of Formula (2-1), a compound of Formula (2-2) or a compound of Formula (2-3). Examples E11 to E13 and E15 contain an unsaturated compound of Formula (2), specifically any one or a combination of two or more of a compound of Formula (2-4), a compound of Formula (2-5) and a compound of Formula (2-6). From the test results, it can be found that the resin composition containing an unsaturated compound of Formula (2) and an article made therefrom, compared with the resin composition containing a saturated compound of Formula (2) and an article made therefrom, at least achieve significant improvements in percent of thermal expansion in Z-axis, reflow shrinkage-stretch rate, flexural modulus and storage modulus decay rate.

From the comparison of Examples E1 to E15 and Comparative Examples C1 to C2, it can be found that relative to 100 parts by weight of the maleimide resin, if the content of compound of Formula (1) is not within 30 to 120 parts by weight, the corresponding resin composition and an article made therefrom will at least have significantly poor properties including percent of thermal expansion in Z-axis, reflow shrinkage-stretch rate, flexural modulus and storage modulus decay rate.

From the comparison of Examples E1 to E15 and Comparative Examples C3 to C4, it can be found that relative to 100 parts by weight of the maleimide resin, if the content of compound of Formula (2) is not within 3 to 20 parts by weight, the corresponding resin composition and an article made therefrom will at least have significantly poor properties including thermal decomposition temperature, percent of thermal expansion in Z-axis, reflow shrinkage-stretch rate, flexural modulus and storage modulus decay rate.

From the comparison of Examples E1 to E15 and Comparative Examples C5 to C8, it can be found that if a conventional curing accelerator different from the compound of Formula (2) is used, the corresponding resin composition and an article made therefrom will at least have significantly poor properties including thermal decomposition temperature, percent of thermal expansion in Z-axis, reflow shrinkage-stretch rate, flexural modulus and storage modulus decay rate.

From the comparison of Examples E1 to E15 and Comparative Examples C9 to C10, it can be found that if a conventional flame retardant different from the compound of Formula (1) is used, the corresponding resin composition and an article made therefrom will at least have significantly poor properties including thermal decomposition temperature, percent of thermal expansion in Z-axis, reflow shrinkage-stretch rate, flexural modulus and storage modulus decay rate.

The above detailed description and examples are merely illustrative in nature and are not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description can provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition, comprising:

(A) 100 parts by weight of a maleimide resin;

(B) 30 to 120 parts by weight of a compound of Formula (1); and (C) 3 to 20 parts by weight of a compound of Formula (2), Formula (1)

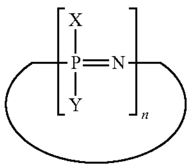

Formula (2)

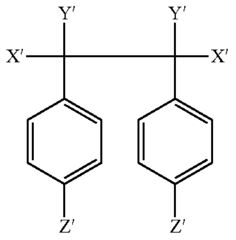

in Formula (1), n is an integer of 3 to 6, and X and Y each independently represent o-vinylphenoxy group, m-vinylphenoxy group or p-vinylphenoxy group;

in Formula (2), each X', Y' and Z' independently represent an alkyl group with 1 to 4 carbon atoms, a phenyl group, a hydrogen atom or an unsaturated C═C double bond-containing group.

2. The resin composition of claim 1, wherein the maleimide resin comprises any one of 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-dimethylphenyl maleimide, N-2,6-dimethylphenyl maleimide, N-phenylmaleimide, vinyl benzyl maleimide, maleimide containing m-arylene structure, maleimide containing biphenylalkylene structure, maleimide containing indane structure and maleimide containing aliphatic structure with 10 to 50 carbon atoms, or a combination thereof.

3. The resin composition of claim 2, wherein the maleimide containing m-arylene structure comprises a maleimide of Formula (3), the maleimide containing biphenylalkylene structure comprises a maleimide of Formula (4), and the maleimide containing indane structure comprises a maleimide of Formula (5),

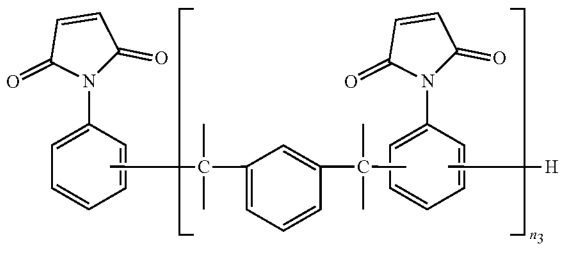

Formula (3), wherein $n_3$ is a number of 1 to 10;

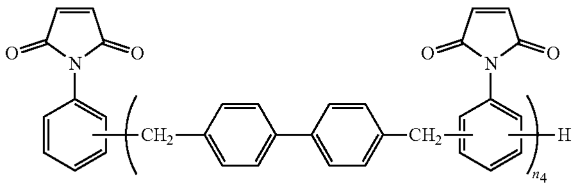

Formula (4), wherein $n_4$ is a number of 1 to 10;

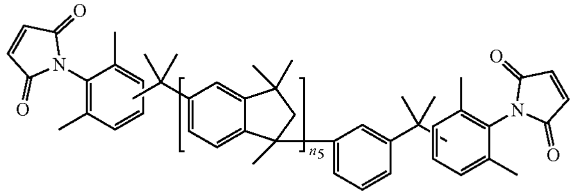

Formula (5), wherein $n_5$ is a number of 0.5 to 20.

4. The resin composition of claim 1, wherein the compound of Formula (2) has at least one unsaturated C═C double bond-containing group.

5. The resin composition of claim 1, wherein, in Formula (2), at least one of X', Y' and Z' represents a vinyl group, a styryl group, an allyl group or a (meth)acryloyloxy group.

6. The resin composition of claim 1, wherein the compound of Formula (1) comprises any one of a compound of Formula (1-1) to a compound of Formula (1-14) or a combination thereof:

Formula (1-1)

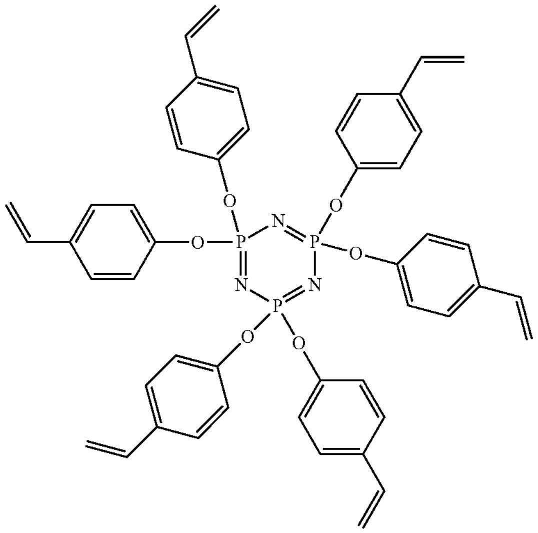

-continued
Formula (1-2)
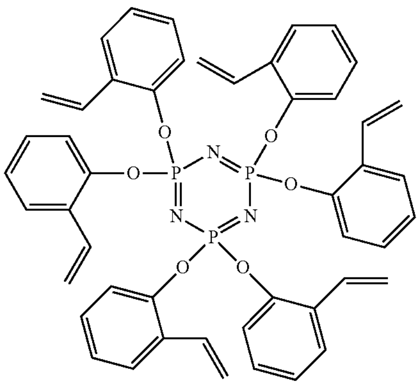
Formula (1-3)
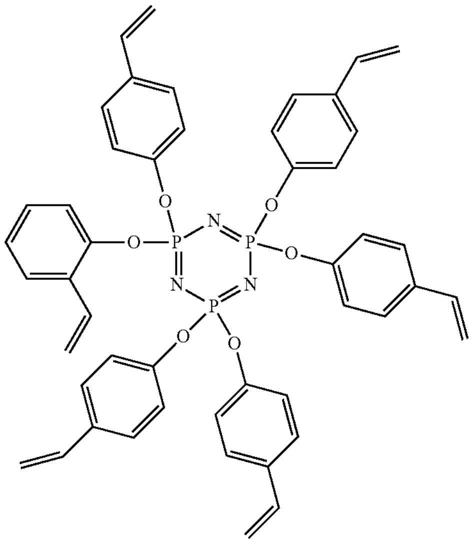
Formula (1-4)
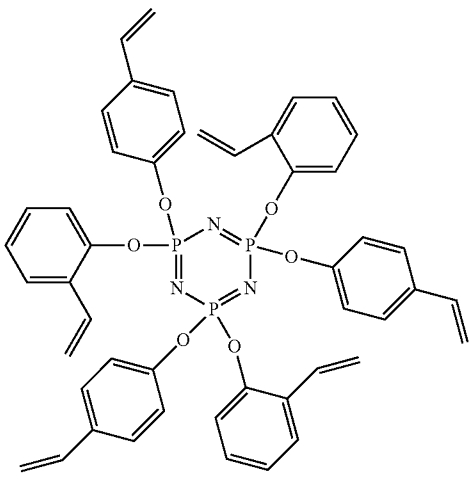
-continued
Formula (1-5)
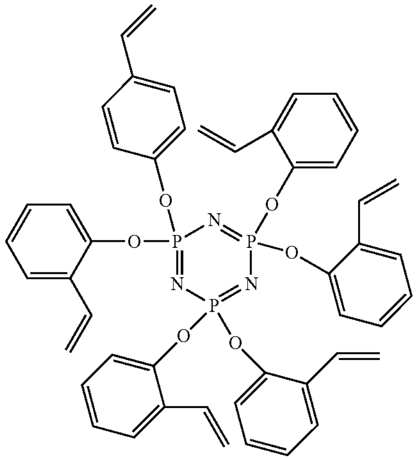
Formula (1-6)
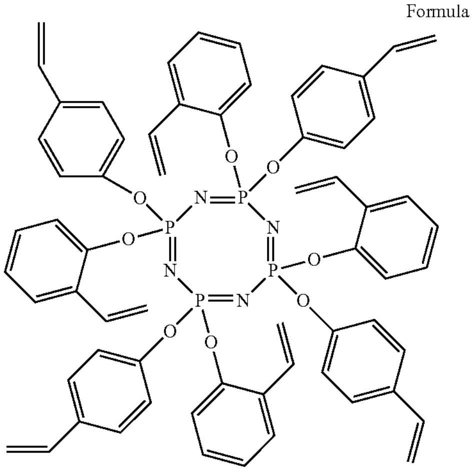
Formula (1-7)
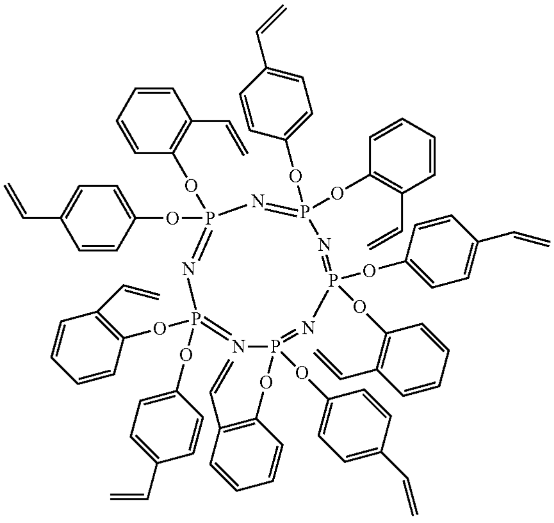

-continued
Formula (-18)
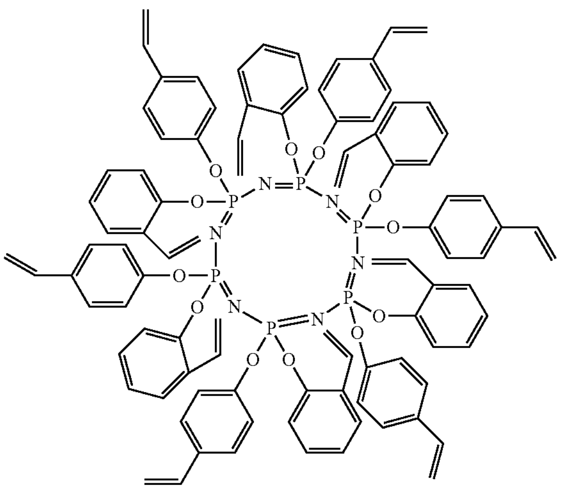
Formula (1-9)
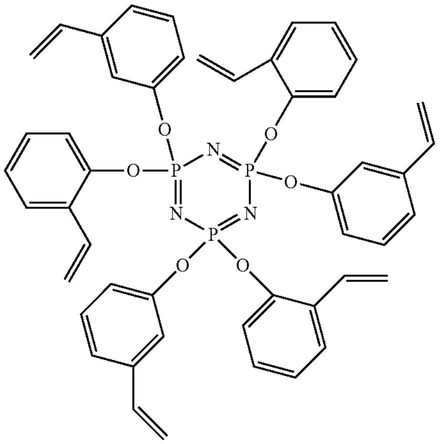
Formula (1-10)
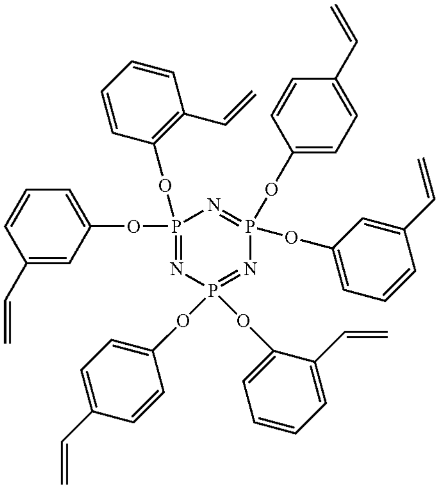
-continued
Formula (1-11)
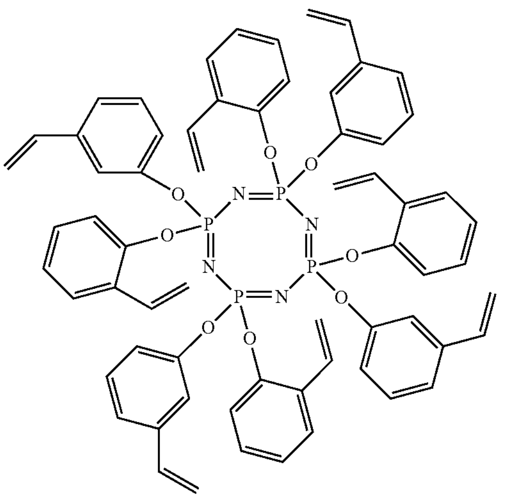
Formula (1-12)
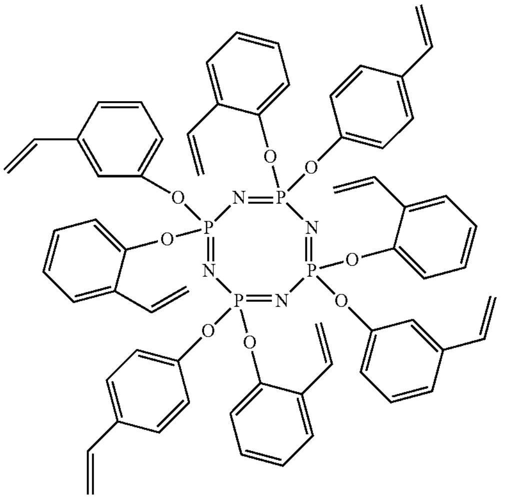
Formula (1-13)
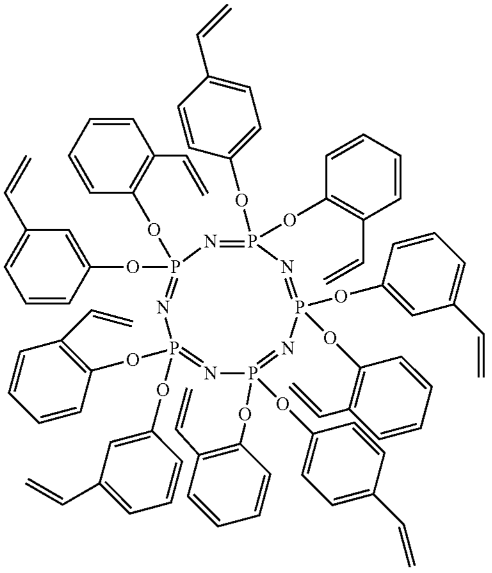

-continued

Formula (1-14)

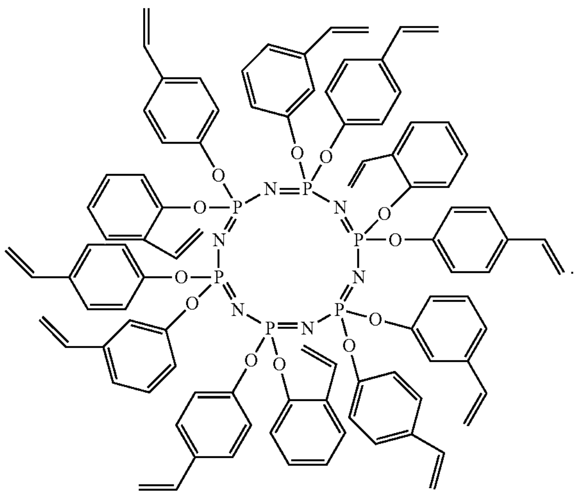

7. The resin composition of claim 1, wherein the compound of Formula (2) comprises any one of a compound of Formula (2-1) to a compound of Formula (2-6) or a combination thereof:

Formula (2-1)

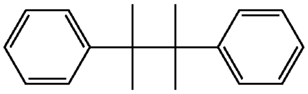

Formula (2-2)

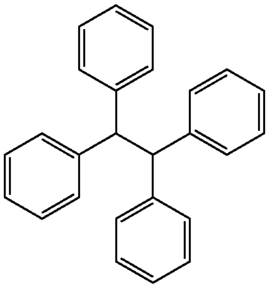

Formula (2-3)

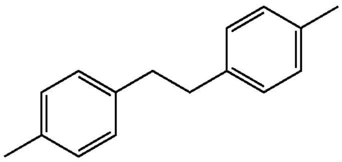

Formula (2-4)

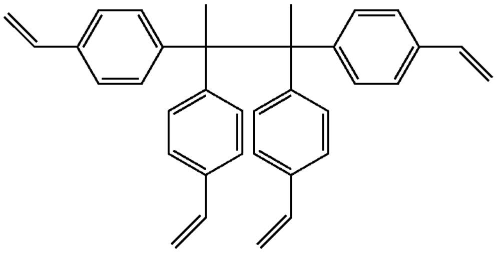

-continued

Formula (2-5)

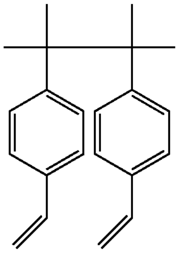

Formula (2-6)

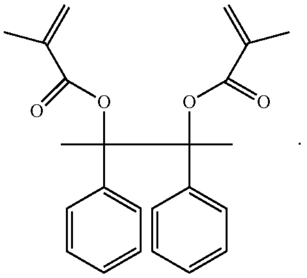

8. The resin composition of claim 1, further comprising 2 to 30 parts by weight of an unsaturated C═C double bond-containing crosslinking agent selected from any one of bis(vinylphenyl)ethane, divinylbenzene, divinylnaphthalene, divinylbiphenyl, triallyl isocyanurate, triallyl cyanurate, vinylbenzocyclobutene, bis(vinylbenzyl)ether, trivinyl cyclohexane, diallyl bisphenol A, acrylate with two or more functional groups, butadiene, decadiene and octadiene or a combination thereof.

9. The resin composition of claim 1, further comprising any one of a polyolefin, a benzoxazine resin, an epoxy resin, a polyester resin, a phenolic resin, an amine curing agent, a polyamide, a polyimide, a styrene maleic anhydride and a cyanate ester or a combination thereof.

10. The resin composition of claim 1, further comprising any one of an inorganic filler, a flame retardant different from the compound of Formula (1), a curing accelerator different from the compound of Formula (2), a polymerization inhibitor, a solvent, a silane coupling agent, a coloring agent and a toughening agent or a combination thereof.

11. An article made from the resin composition of claim 1, comprising a prepreg, a resin film, a laminate or a printed circuit board.

12. The article of claim 11, having a thermal decomposition temperature as measured by reference to IPC-TM-650 2.4.24.6 of greater than or equal to 430° C.

13. The article of claim 11, having a percent of thermal expansion in Z-axis as measured by reference to IPC-TM-650 2.4.24.5 of less than or equal to 0.80%.

14. The article of claim 11, having a reflow shrinkage-stretch rate as measured by reference to IPC-TM-650 2.4.39 of less than or equal to 180 ppm.

15. The article of claim 11, having a flexural modulus as measured by reference to IPC-TM-650 2.4.4 of greater than or equal to 23.0 GPa.

16. The article of claim 11, having a storage modulus decay rate as measured and calculated by reference to IPC-TM-650 2.4.24.4 of less than or equal to 26.3%.

* * * * *